United States Patent
Hagan et al.

(10) Patent No.: US 9,915,280 B2
(45) Date of Patent: Mar. 13, 2018

(54) BEARING ASSEMBLY

(71) Applicants: Timothy J. Hagan, Succasunna, NJ (US); Abe Sanchez, Dover, NJ (US); Brian T. Graham, Succasunna, NJ (US)

(72) Inventors: Timothy J. Hagan, Succasunna, NJ (US); Abe Sanchez, Dover, NJ (US); Brian T. Graham, Succasunna, NJ (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 32 days.

(21) Appl. No.: 14/042,247

(22) Filed: Sep. 30, 2013

(65) Prior Publication Data
US 2014/0093332 A1    Apr. 3, 2014

Related U.S. Application Data

(60) Provisional application No. 61/708,002, filed on Sep. 30, 2012.

(51) Int. Cl.
*F16B 19/04*   (2006.01)
*F16B 19/08*   (2006.01)
(Continued)

(52) U.S. Cl.
CPC ............... *F16B 19/08* (2013.01); *F16B 19/10* (2013.01); *F16B 19/1081* (2013.01);
(Continued)

(58) Field of Classification Search
CPC .. F16B 19/08; F16B 19/10; F16B 2019/1018; F16B 19/1081; Y10T 29/49956; Y10T 16/05; E05D 5/14
(Continued)

(56) References Cited

U.S. PATENT DOCUMENTS 1,452,252 A    4/1923  Muller
1,604,613 A   10/1926  Stoller
(Continued)

FOREIGN PATENT DOCUMENTS

DE    36 13 123 A1 * 10/1987
EP       1869334 B1    12/2007
(Continued)

OTHER PUBLICATIONS

International Search Report for PCT/US2013/062726 dated Jan. 6, 2014, 1 page.

*Primary Examiner* — Flemming Saether
(74) *Attorney, Agent, or Firm* — Abel Law Group, LLP; Chi Suk Kim

(57) ABSTRACT

A bearing device is disclosed and can include a bushing. The bushing can include a hollow body that can have an internal diameter, $ID_{HB}$, and proximal ends and distal ends opposite each other. The bushing can also include a first bushing flange extending radially outwardly from the proximal end of the body and an axial extension extending from the distal end of the hollow body. The axial extension is deformable so as to form a second bushing flange extending radially outwardly from the distal and of the hollow body. The axial extension can have an internal diameter, $ID_{AE}$, $\leq ID_{HB}$.

17 Claims, 9 Drawing Sheets

(51) Int. Cl.
*F16B 19/10* (2006.01)
*F16C 11/04* (2006.01)
*F16C 33/08* (2006.01)
*F16B 19/02* (2006.01)
*F16C 35/02* (2006.01)
*F16C 17/10* (2006.01)

(52) U.S. Cl.
CPC .............. *F16C 11/04* (2013.01); *F16C 33/08* (2013.01); *F16B 19/02* (2013.01); *F16B 2019/1018* (2013.01); *F16C 17/10* (2013.01); *F16C 35/02* (2013.01); *Y10T 29/49956* (2015.01)

(58) Field of Classification Search
USPC ....... 384/296; 411/501, 45, 340, 344; 16/2.1
See application file for complete search history.

(56) References Cited

U.S. PATENT DOCUMENTS

| | | | |
|---|---|---|---|
| 2,168,227 A | 8/1939 | Lignian | |
| 2,199,271 A * | 4/1940 | Schaefer | 411/80.2 |
| 2,203,101 A | 6/1940 | Pausin | |
| 2,246,888 A * | 6/1941 | Messenger | 411/58 |
| 2,264,590 A | 12/1941 | Sabins | |
| 2,340,423 A * | 2/1944 | O'Shaughnessy, Jr. et al. | 411/80.2 |
| 2,384,096 A | 9/1945 | Kishline | |
| 2,441,913 A | 5/1948 | Taylor | |
| 2,605,316 A | 7/1952 | Grimsley | |
| 2,616,011 A | 10/1952 | Elliott | |
| 2,658,129 A | 11/1953 | Nichols et al. | |
| 2,717,440 A | 9/1955 | Anacker | |
| 2,746,131 A | 5/1956 | Elliott | |
| 2,761,202 A | 9/1956 | Beare | |
| 2,778,465 A | 1/1957 | Stenchever et al. | |
| 2,826,110 A * | 3/1958 | Lemelson | 411/80.2 |
| 2,883,012 A | 4/1959 | Hoffman | |
| 2,927,674 A | 3/1960 | Everitt | |
| 2,948,773 A | 8/1960 | Hawes | |
| 2,956,468 A * | 10/1960 | Macy | 411/41 |
| 2,964,341 A | 12/1960 | Doyle et al. | |
| 3,015,687 A | 1/1962 | Ruscito | |
| 3,125,905 A | 3/1964 | Stein | |
| 3,232,161 A * | 2/1966 | Fernberg | F16B 5/128 24/287 |
| 3,557,425 A | 1/1971 | Scharf | |
| 3,572,480 A | 3/1971 | Nagel | |
| 3,618,732 A | 11/1971 | Forse | |
| 3,622,143 A | 11/1971 | Van Ranst, Jr. | |
| 3,646,290 A | 2/1972 | Borgmann | |
| 3,646,800 A | 3/1972 | Martin | |
| 3,690,188 A | 9/1972 | McMillen | |
| 3,710,674 A * | 1/1973 | Tabor | 411/61 |
| 3,963,690 A | 6/1976 | Pruitt et al. | |
| 3,983,968 A | 10/1976 | Weinmann | |
| 4,155,417 A | 5/1979 | Ziems | |
| 4,156,509 A | 5/1979 | Mander et al. | |
| 4,183,131 A | 1/1980 | Seya et al. | |
| 4,405,272 A * | 9/1983 | Wollar | 411/41 |
| 4,441,835 A | 4/1984 | Davis | |
| 5,060,362 A | 10/1991 | Birke et al. | |
| 5,259,689 A * | 11/1993 | Arand | F16B 21/065 403/16 |
| 5,336,176 A | 8/1994 | Yoon | |
| 5,388,915 A | 2/1995 | Huber | |
| 5,489,354 A | 2/1996 | Gold | |
| 5,503,510 A | 4/1996 | Golan | |
| 5,729,948 A * | 3/1998 | Levy et al. | 52/656.9 |
| 5,749,722 A | 5/1998 | Driscoll et al. | |
| 5,921,633 A | 7/1999 | Neibling et al. | |
| 5,945,606 A * | 8/1999 | Tokunaga et al. | 73/756 |
| 6,000,672 A | 12/1999 | Bunker | |
| 6,004,088 A * | 12/1999 | Hunt | F16B 13/0808 411/21 |
| 6,224,310 B1 | 5/2001 | Summerlin et al. | |
| 6,238,127 B1 * | 5/2001 | Jhumra | F16B 5/02 384/295 |
| 6,505,988 B1 | 1/2003 | Oddsen, Jr. | |
| 6,648,512 B1 | 11/2003 | Storch et al. | |
| 6,749,384 B1 * | 6/2004 | Ellis | F16B 19/1081 411/45 |
| 6,912,096 B2 | 6/2005 | Terada | |
| 6,941,627 B2 | 9/2005 | Fritsche et al. | |
| 7,699,394 B2 | 4/2010 | Humer et al. | |
| 7,818,858 B2 | 10/2010 | Daniels et al. | |
| 7,854,729 B2 | 12/2010 | Romano et al. | |
| 7,979,967 B2 * | 7/2011 | Schmidt | 29/11 |
| 7,993,085 B2 * | 8/2011 | McClure | 411/55 |
| 8,061,009 B2 | 11/2011 | Gory et al. | |
| 2004/0042873 A1 | 3/2004 | Burmahln | |
| 2004/0136804 A1 | 7/2004 | Clinch et al. | |
| 2005/0047945 A1 | 3/2005 | Metzger | |
| 2005/0084191 A1 | 4/2005 | Fees et al. | |
| 2006/0217674 A1 | 9/2006 | Romano et al. | |
| 2007/0085643 A1 | 4/2007 | Gula | |
| 2007/0268654 A1 | 11/2007 | Gory et al. | |
| 2007/0289351 A1 | 12/2007 | Glenn | |
| 2008/0213121 A1 | 9/2008 | Beguinot et al. | |
| 2009/0097913 A1 | 4/2009 | Begel et al. | |
| 2009/0110338 A1 | 4/2009 | Blase et al. | |
| 2009/0278416 A1 | 11/2009 | Ida et al. | |
| 2010/0156154 A1 | 6/2010 | Humer et al. | |
| 2010/0163528 A1 | 7/2010 | Seo | |
| 2011/0008125 A1 | 1/2011 | Moon et al. | |
| 2011/0084188 A1 | 4/2011 | Oddsen, Jr. et al. | |
| 2011/0118681 A1 | 5/2011 | Romano et al. | |
| 2011/0118682 A1 | 5/2011 | Romano et al. | |
| 2011/0150597 A1 | 6/2011 | Muramatsu et al. | |

FOREIGN PATENT DOCUMENTS

| | | |
|---|---|---|
| JP | S5395936 U | 8/1978 |
| JP | S62199522 U | 12/1987 |
| JP | H09112559 A | 5/1997 |
| JP | 2003-065309 A | 3/2003 |
| JP | 2007239838 A | 9/2007 |
| KR | 20080016549 A | 2/2008 |
| WO | 0036307 A1 | 6/2000 |
| WO | 2014052976 A1 | 4/2014 |

* cited by examiner

BEARING ASSEMBLY

CROSS-REFERENCE TO RELATED APPLICATION(S)

This application claims priority under 35 U.S.C. § 119(e) to U.S. Patent Application No. 61/708,002, entitled "BEARING ASSEMBLY" by Timothy J. Hagan, Abe Sanchez, and Brian T. Graham, filed Sep. 30, 2012, which is assigned to the current assignee hereof and incorporated herein by reference in its entirety.

BACKGROUND

Field of the Disclosure

The present disclosure is directed to bearing and bearing assemblies, particularly the present disclosure is directed to a bearing assembly having a deformable bushing.

Description of the Related Art

Bearing and bearing assemblies are used in a variety of applications. In one application, bearing assemblies can be used as pivots in automobiles for reclining seats. Specifically, a pivot can be mounted within aligned openings of pivot plates or brackets to inhibit metal to metal engagement which could cause wear and undesirable noise such as squeaking and rattling.

Typically, a reclining seat can include have a seat bottom and a seat back. The seat back can pivot between various upright and reclined positions. A releasable latch type mechanism can be provided for selectively maintaining the seat back in the upright or one or more reclined positions. The seat bottom and seat back have pivot members such as plates or brackets mounted thereon with each of such pivot members having at least one opening formed therein. The pivot members can be connected via a pivot apparatus.

Accordingly, the industry continues to need improvements in bearing assemblies, particularly to bearing assemblies that can be used as pivots.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

Figure 1:
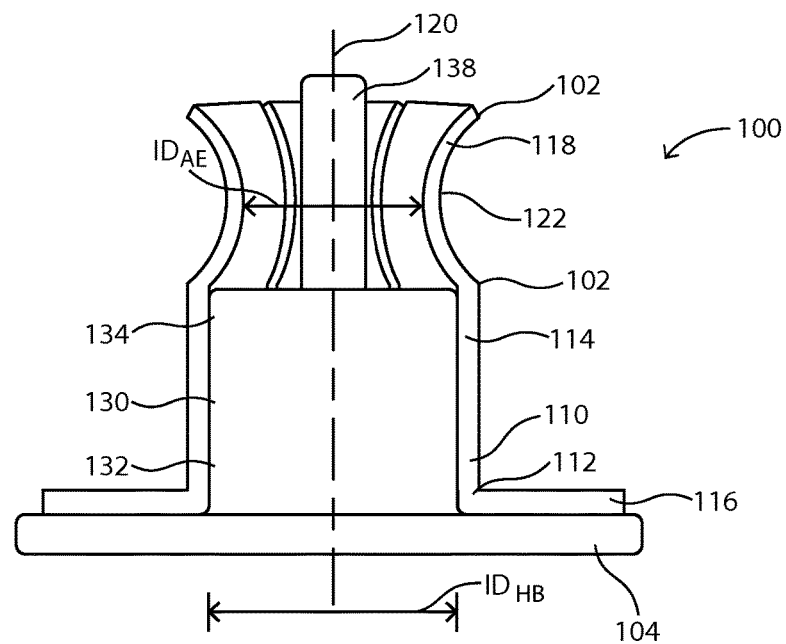
FIG. 1 includes a cross-sectional view of a bearing assembly in accordance with an embodiment.

The following description is directed to bearing assemblies, and particularly, to bearing assemblies that can be used to connect two or more links to create a multi-link assembly. In one aspect, a bearing assembly that includes a bushing and a rivet can be inserted into a bore formed in a first link. A second link can be fitted over a deformable post of the rivet and as the second link is moved toward the first link, the second link can cause an axial extension on the bushing to deform and form a flange between the first link and the second link Thereafter, the deformable post can be flattened in order to create a rivet flange to hold the links together.

In another aspect, the axial extension of the bushing can include a narrowed, first portion that can form a shoulder and a second portion extending from the first portion to form a hinged arm. During installation, the rivet can move through a distance within the bushing and a distal end of the body of the rivet can press against the shoulder in order to cause the hinged arm to begin moving, deforming, or otherwise bending, from a first position in which the hinged arm is substantially parallel to a central axis to a second position in which the hinged arm is angled with respect to the central axis. Further installation of the second link can complete the deformation of the axial extension to form the flange between the first link and the second link.

In yet another aspect, the axial extension of the bushing can include a first portion that extends radially inward from the body of the bushing at a first angle with respect to a central, longitudinal axis to form a ramp and a second portion that extends radially outward from the first portion at a second angle with respect to the central, longitudinal axis to form a flange plate. During installation, the distal end of a rivet installed in the bushing can move along the ramp causing the ramp to be pushed outward. As the ramp is pushed outward by the rivet, the flange plate can be mover from a first position in which the flange plate is angle, or not parallel, with respect to a first bushing flange of the bushing and a second position in which the flange plate is substantially parallel to the first bushing flange.

In still another aspect, the axial extension can include a ramp and a flange plate as described above. In this aspect, however, a two-piece rivet can be installed within the bushing from opposite ends of the bushing. A first rivet portion can be inserted into the bushing and a distal end of the first rivet portion can engage the ramp and push the ramp outward. The movement of the ramp causes the flange portion to begin moving toward the second position. A second rivet portion can be inserted through a second component, or link, and this sub-assembly can be engaged with the bushing so that and end of the second rivet portion fits through the bushing and into the first rivet portion.

As the second rivet portion/second link sub-assembly is further moved into the bushing/first rivet portion sub-assembly, the second rivet portion and the second link can further engage the flange plate of the axial extension and further move the flange plate into the second position.

Referring initially to FIG. 1, a bearing assembly is shown and is generally designated 100. The bearing assembly 100 can include a bushing 102 and a rivet 104 installed within the bushing 102.

As illustrated, the bushing 102 can include a hollow body 110 that can define a proximal end 112 and a distal end 114. A first bushing flange 116 can extend radially outwardly from the proximal end 112 of the hollow body 110. An axial extension 118 can extend from the distal end 114 of the hollow body 110. The axial extension 118 can extend in a direction that is generally parallel to a central, longitudinal axis 120 of the bearing assembly 100.

As described in greater detail below, the axial extension 118 is deformable so as to form a second bushing flange extending radially outwardly from the distal end 114 of the hollow body 110. In particular, the axial extension 118 can include a concave sidewall 122 that is bowed inward with respect to the longitudinal axis 120. Moreover, due to the shape of the concave sidewall 122, the axial extension 118 includes an internal diameter, $ID_{AE}$, that is less than the internal diameter, $ID_{HB}$, of the hollow body 110 of the bushing 102.

FIG. 1 further indicates that the rivet 104 can include a solid body 130 that can define a proximal end 132 and a distal end 134. A first rivet flange 136 can extend radially outwardly from the proximal end 132 of the solid body 130 of the rivet 104. Moreover, deformable post 138 can extend from the distal end 134 of the solid body 130 in a direction that is generally parallel to the central axis 120. The deformable post 138 can be flattened, or otherwise deformed, to form a second rivet flange extending radially outwardly from the distal end 134 of the solid body 130 of the rivet 104.

In a particular aspect, the solid body 130 of the rivet 104 can include a height, $H_{SB}$, and the hollow body 110 of the bushing 102 can include a height, H. In this aspect, $H_{SB}$ can be $\leq H_{HB}$, such as $H_{SB} \leq 99\% H_{HB}$, $H_{SB} \leq 98\% H_{HB}$, $H_{SB} \leq 97\% H_{HB}$, $H_{SB} \leq 96\% H_{HB}$, or $H_{SB} \leq 95\% H_{HB}$. Further, $H_{SB}$ can be $\geq 90\% H_{HB}$, $\geq 91\% H_{HB}$, $\geq 92\% H_{HB}$, $\geq 93\% H_{HB}$, or $\geq 94\% H_{HB}$. $H_{SB}$ can also be within a range between and including any of the % $H_{HB}$ values described herein.

For example, $H_{SB}$ can be $\leq 99\% H_{HB}$ and $\geq 90\% H_{HB}$, such as $H_{SB} \leq 99\% H_{HB}$ and $\geq 91\% H_{HB}$, $H_{SB} \leq 99\% H_{HB}$ and $\geq 92\% H_{HB}$, $H_{SB} \leq 99\% H_{HB}$ and $\geq 93\% H_{HB}$, and $H_{SB} \leq 99\% H_{HB}$ and $\geq 94\% H_{HB}$. $H_{SB}$ can be $\leq 98\% H_{HB}$ and $\geq 90\% H_{HB}$, such as $H_{SB} \leq 98\% H_{HB}$ and $\geq 91\% H_{HB}$, $H_{SB} \leq 98\% H_{HB}$ and $\geq 92\% H_{HB}$, $H_{SB} \leq 98\% H_{HB}$ and $\geq 93\% H_{HB}$, and $H_{SB} \leq 98\% H_{HB}$ and $\geq 94\% H_{HB}$. $H_{SB}$ can be $\leq 97\% H_{HB}$ and $\geq 90\% H_{HB}$, such as $H_{SB} \leq 97\% H_{HB}$ and $\geq 91\% H_{HB}$, $H_{SB} \leq 97\% H_{HB}$ and $\geq 92\% H_{HB}$, $H_{SB} \leq 97\% H_{HB}$ and $\geq 93\% H_{HB}$, and $H_{SB} \leq 97\% H_{HB}$ and $\geq 94\% H_{HB}$. $H_{SB}$ can be $\leq 96\% H_{HB}$ and $\geq 90\% H_{HB}$, such as $H_{SB} \leq 96\% H_{HB}$ and $\geq 91\% H_{HB}$, $H_{SB} \leq 96\% H_{HB}$ and $\geq 92\% H_{HB}$, $H_{SB} \leq 96\% H_{HB}$ and $\geq 93\% H_{HB}$, and $H_{SB} \leq 96\% H_{HB}$ and $\geq 94\% H_{HB}$. $H_{SB}$ can be $\leq 95\% H_{HB}$ and $\geq 90\% H_{HB}$, such as $H_{SB} \leq 95\% H_{HB}$ and $\geq 91\% H_{HB}$, $H_{SB} \leq 95\% H_{HB}$ and $\geq 92\% H_{HB}$, $H_{SB} \leq 95\% H_{HB}$ and $\geq 93\% H_{HB}$, and $H_{SB} \leq 95\% H_{HB}$ and $\geq 94\% H_{HB}$.

Figure 2:
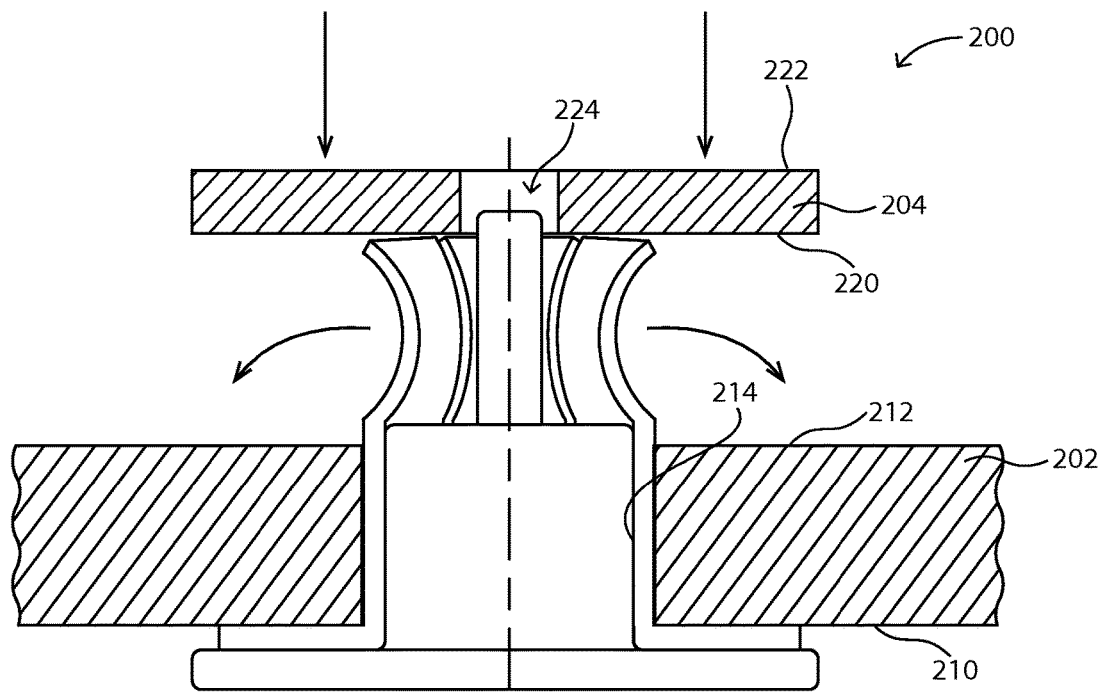
FIG. 2 includes a first cross-sectional view of a multi-link assembly in accordance with an embodiment.
Figure 3:
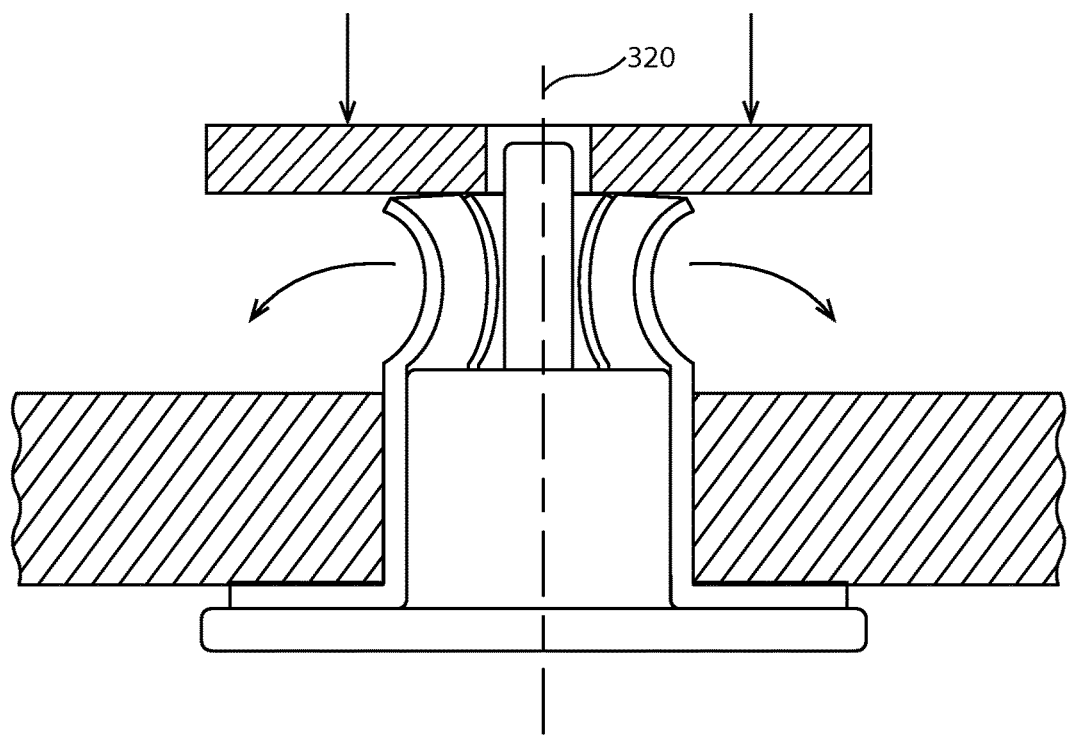
FIG. 3 includes a second cross-sectional view of a multi-link assembly in accordance with an embodiment.
Figure 4:
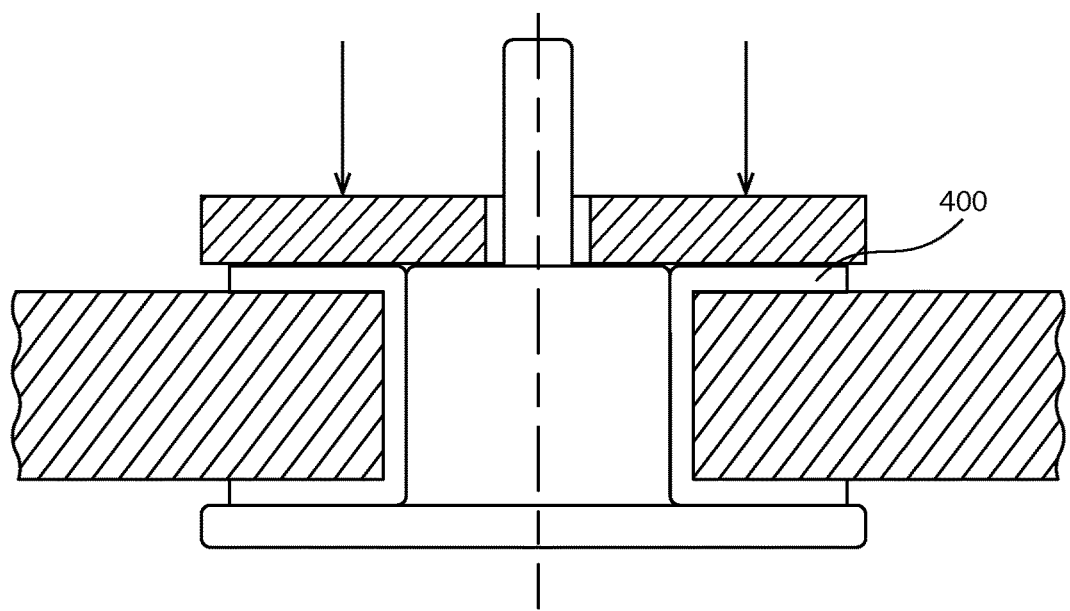
FIG. 4 includes a third cross-sectional view of a multi-link assembly in accordance with an embodiment.

FIG. 2 through FIG. 4 illustrate a multi-link assembly 200 in which the bearing assembly 100 can be used to connect a first link 202, or first component, to a second link 204, or second component. As depicted, the first link 202 can include a first face 210, a second face 212 opposite the first face 210, and a bore 214 that can extend through the first link 202 from the first face 210 to the second face 212. The second link 204 can also include a first face 220, a second face 222 opposite the first face 220, and a bore 224 that can extend through the second link 204 from the first face 220 to the second face 222.

As illustrated in FIG. 2 through FIG. 4, the bearing assembly 100 can be installed within the bore 214 in the first link 202 so that the first bushing flange 116 of the bushing 102 engages the first face 210 of the of the first link 202 and an outer wall of the bushing 102 engages, or contacts, an inner wall of the bore 214. The axial extension 118 of the bushing 102 can extend out of the bore 214 beyond the second face 212 of the first link 202. Further, the deformable post 138 can also extend out of the bore 214 beyond the second face 212 of the first link 202.

The second link 204 can be installed over the deformable post 138 of the rivet 104 so that the bore 224 in the second link 204 fits around the deformable post 138 and the first face 220 of the second link 204 engages and contacts the end of the axial extension 118. As the second link 204 is moved toward the first link 202, the shape of the axial extension 118 promotes outward bending of the axial extension 118 so that the axial extension 118 can be bent outward and flattened between the first link 202 and the second link 204 in order to form a second bushing flange 400, as illustrated in FIG. 4, that extends radially outwardly from the hollow body 110 of the bushing 102.

Thereafter, at least a portion of the deformable post 138 can be flattened against the second face 222 of the second link 204 to form a second rivet flange (not shown) and both links 202, 204 and the bushing 102 can be captured between the rivet flanges 104.

Figure 5:
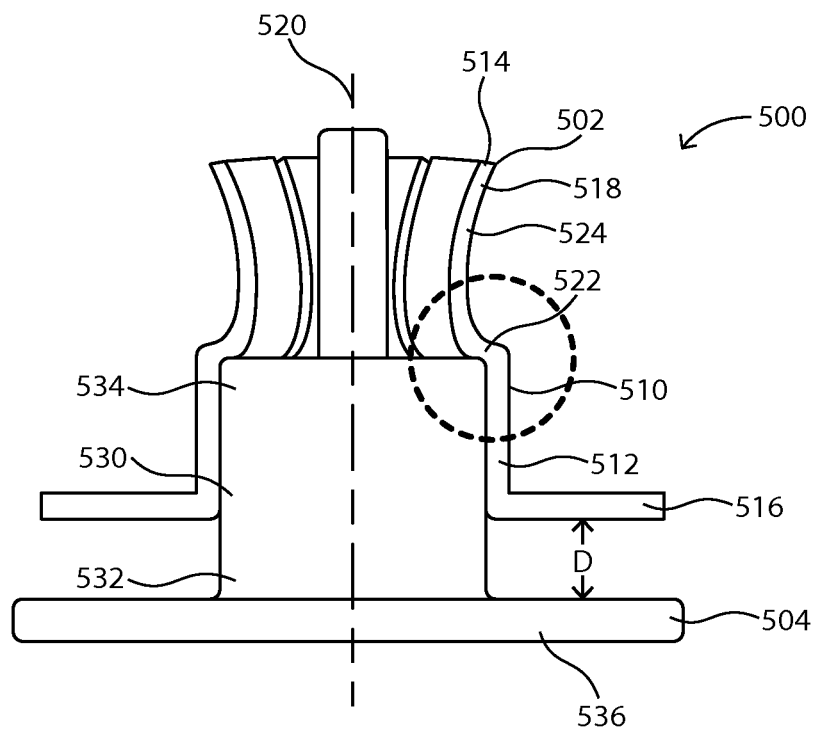
FIG. 5 includes a cross-sectional view of a bearing assembly in accordance with another embodiment.
Figure 6:
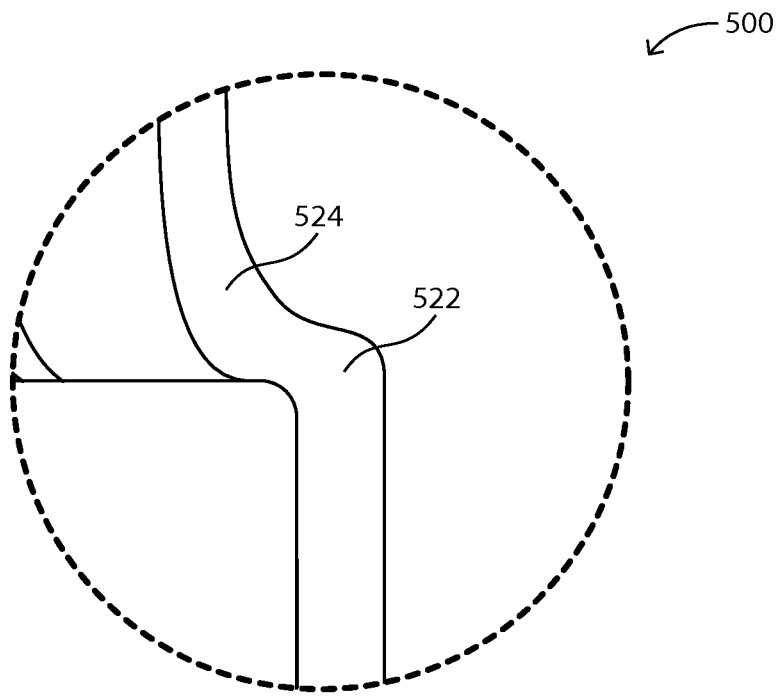
FIG. 6 includes a detailed view of a bearing assembly in accordance with another embodiment taken at circle 6 in FIG. 5.

FIG. 5 illustrates another bearing assembly 500. The bearing assembly 500 can include a bushing 502 and a rivet 504 installed within the bushing 502.

As illustrated, the bushing 502 can include a hollow body 510 that can define a proximal end 512 and a distal end 514. A first bushing flange 516 can extend radially outwardly from the proximal end 512 of the hollow body 510. An axial extension 518 can extend from the distal end 514 of the hollow body 510. The axial extension 518 can extend in a direction that is generally parallel to a central, longitudinal axis 520 of the bearing assembly 500.

As described in greater detail below, the axial extension 518 is deformable so as to form a second bushing flange extending radially outwardly from the distal end 514 of the hollow body 510. In particular, the axial extension 518 can include a first portion 522 that can extend radially inward with respect to the longitudinal axis 520 to form a shoulder and a second portion 524 that can extend longitudinally away from the first portion 522, e.g., along a direction substantially parallel to the longitudinal axis 520, to form a hinged arm. Moreover, due to the shape of the first portion 522, the axial extension 518 includes an internal diameter, $ID_{AE}$, that is less than the internal diameter, $ID_{HB}$, of the hollow body 510 of the bushing 502.

FIG. 5 further indicates that the rivet 504 can include a solid body 530 that can define a proximal end 532 and a distal end 534. A first rivet flange 536 can extend radially outwardly from the proximal end 532 of the solid body 530 of the rivet 504. Moreover, deformable post 538 can extend from the distal end 534 of the solid body 530 in a direction that is generally parallel to the central axis 520. The deformable post 538 can be flattened, or otherwise deformed, to form a second rivet flange extending radially outwardly from the distal end 534 of the solid body 530 of the rivet 504.

As illustrated in FIG. 5, the solid body 530 of the rivet 504 can be configured to fit into the hollow body 510 of the bushing 502 such that the first rivet flange 536 is spaced apart from the first bushing flange 516 of the bushing 502 at a distance, D. The rivet 504 can be configured to travel axially along D in a linear direction during installation to at least partially deform the axial extension 518 to form the second bushing flange of the bushing 502.

Specifically, the shoulder formed by the first portion 522 is configured to be pushed outward by the insertion, or movement, of the rivet 504 through the hollow body 510 of the bushing 502. As the rivet 504 is moved over D, the shoulder can be pushed outward by the distal end 534 of the body 530 of the rivet 504. As the shoulder is pushed outward by the rivet 504, the hinged arm formed by the second portion 524 can rotate from a first position in which the hinged arm is substantially parallel to the longitudinal axis 520 and a second position in which the hinged arm is angled outwardly with respect to the longitudinal axis 520.

In a particular aspect, the solid body 530 of the rivet 504 can include a height, $H_{SB}$, and D can be $\geq 10\% H_{SB}$, such as $\geq 15\% H_{SB}$, $\geq 20\% H_{SB}$, $\geq 25\% H_{SB}$, or $\geq 30\% H_{SB}$. Further, D can be $\leq 50\% H_{SB}$, such as $\leq 45\% H_{SB}$, $\leq 40\% H_{SB}$, or $\leq 35\% H_{SB}$. In another aspect, D can be within a range between and including any of the % $H_{SB}$ values described above.

For example, D can be $\geq 10\% H_{SB}$ and $\leq 50\% H_{SB}$, such as $\geq 10\% H_{SB}$ and $\leq 45\% H_{SB}$, $\geq 10\% H_{SB}$ and $\leq 40\% H_{SB}$, or $\geq 10\% H_{SB}$ and $\leq 35\% H_{SB}$. In another aspect, D can be $\geq 15\% H_{SB}$ and $\leq 50\% H_{SB}$, such as $\geq 15\% H_{SB}$ and $\leq 45\% H_{SB}$, $\geq 15\% H_{SB}$ and $\leq 40\% H_{SB}$, or $\geq 15\% H_{SB}$ and $\leq 35\% H_{SB}$. D can be $\geq 20\% H_{SB}$ and $\leq 50\% H_{SB}$, such as $\geq 20\% H_{SB}$ and $\leq 45\% H_{SB}$, $\geq 20\% H_{SB}$ and $\leq 40\% H_{SB}$, or $\geq 20\% H_{SB}$ and $\leq 35\% H_{SB}$. D can be $\geq 25\% H_{SB}$ and $\leq 50\% H_{SB}$, such as $\geq 25\% H_{SB}$ and $\leq 45\% H_{SB}$, $\geq 25\% H_{SB}$ and $\leq 40\% H_{SB}$, or $\geq 25\% H_{SB}$ and $\leq 35\% H_{SB}$. Moreover, D can be $\geq 30\% H_{SB}$ and $\leq 50\% H_{SB}$, such as $\geq 30\% H_{SB}$ and $\leq 45\% H_{SB}$, $\geq 30\% H_{SB}$ and $\leq 40\% H_{SB}$, or $\geq 30\% H_{SB}$ and $\leq 35\% H_{SB}$.

Figure 7:
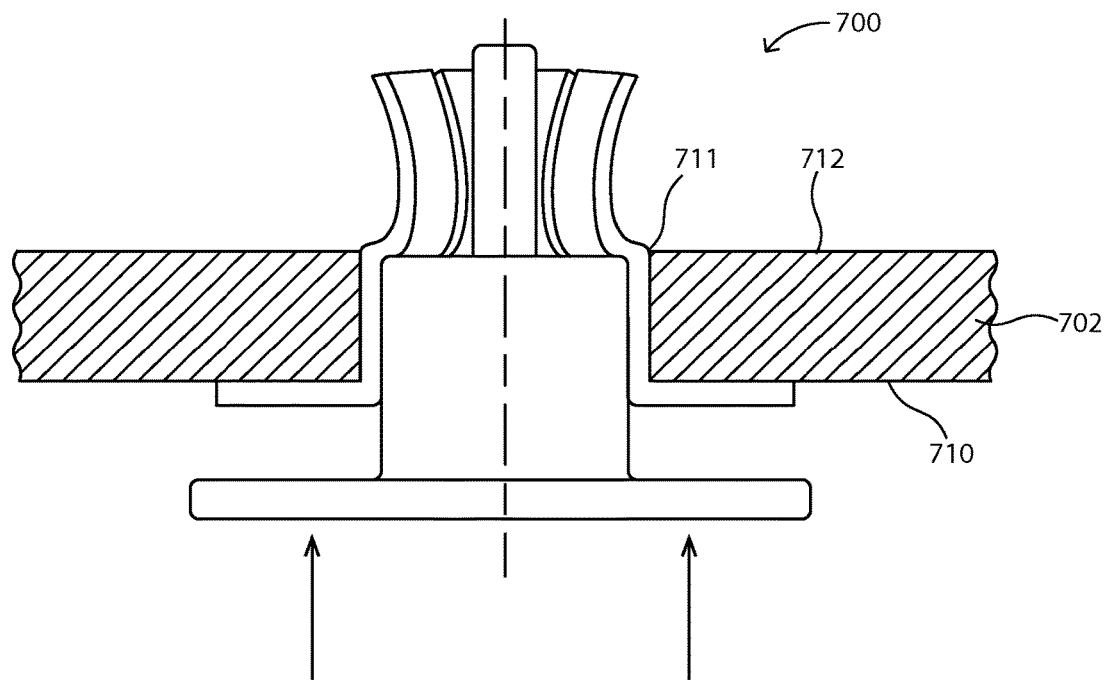
FIG. 7 includes a first cross-sectional view of a multi-link assembly in accordance with another embodiment.
Figure 8:
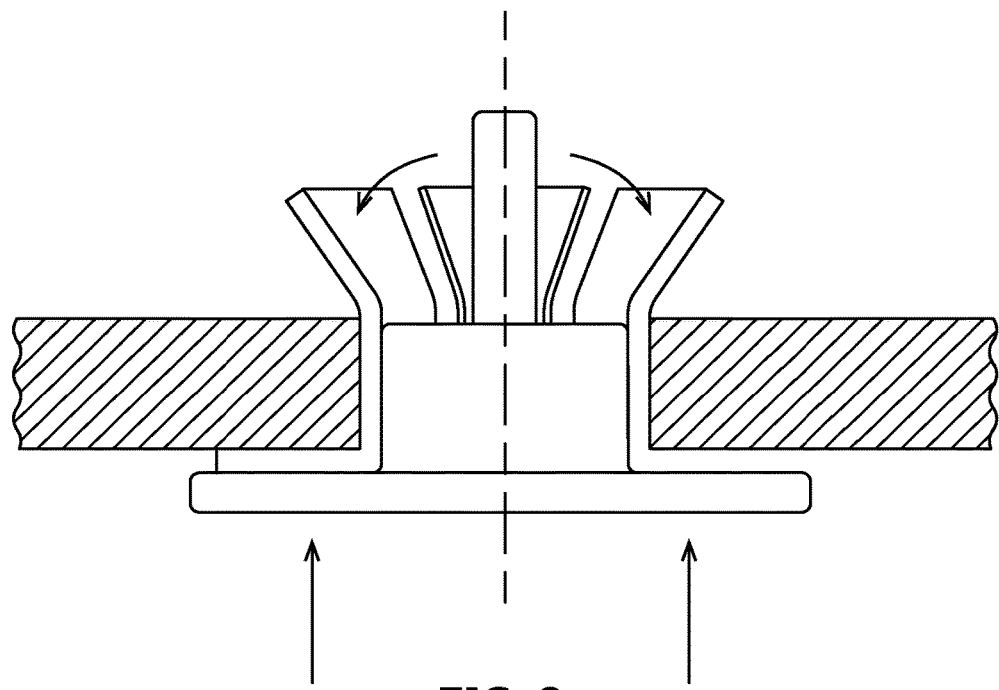
FIG. 8 includes a second cross-sectional view of a multi-link assembly in accordance with another embodiment.
Figure 9:
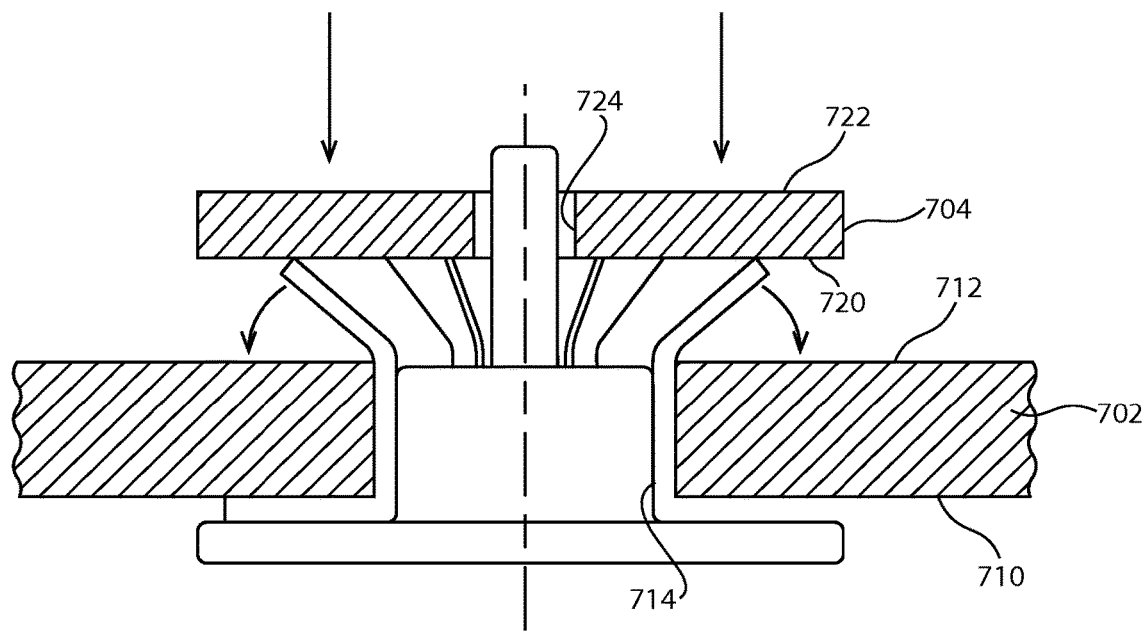
FIG. 9 includes a third cross-sectional view of a multi-link assembly in accordance with another embodiment.

FIG. 7 through FIG. 9 illustrate a multi-link assembly 700 in which the bearing assembly 500 can be used to connect a first link 702, or first component, to a second link 704, or second component. As depicted, the first link 702 can include a first face 710, a second face 712 opposite the first face 710, and a bore 714 that can extend through the first link 702 from the first face 710 to the second face 712. The second link 704 can also include a first face 720, a second face 722 opposite the first face 720, and a bore 724 that can extend through the second link 704 from the first face 720 to the second face 722.

As illustrated in FIG. 7 through FIG. 9, the bearing assembly 500 can be installed within the bore 714 in the first link 702 so that the first bushing flange 516 of the bushing 502 engages the first face 710 of the first link 702 and an outer wall of the bushing 502 engages, or contacts, an inner wall of the bore 714. The axial extension 518 of the bushing 502 can extend out of the bore 714 beyond the second face 712 of the first link 702. Further, the deformable post 538 can also extend out of the bore 714 beyond the second face 712 of the first link 702.

After the bearing assembly 500 is installed within the bore 714 of the first link 702, the rivet 504 can be moved over D until the first rivet flange 536 is in contact with the first bushing flange 516 of the bushing 502. As the rivet 504 moves within the bushing 502, the rivet 504 can at least partially deform the axial extension 518 to form the second bushing flange of the bushing 502.

Specifically, the shoulder formed by the first portion 522 is pushed outward by the rivet 504 and as the shoulder is pushed outward by the rivet 504, the hinged arm can rotate from the first position in which the hinged arm is substantially parallel to the longitudinal axis 520 and a second position in which the hinged arm is angled outwardly with respect to the longitudinal axis 520.

Thereafter, the second link 704 can be installed over the deformable post 538 of the rivet 504 so that the bore 724 in the second link 704 fits around the deformable post 538 and the first face 720 of the second link 704 engages and contacts the end of the axial extension 518, e.g., the end of the hinged arm formed by the second portion 524 of the axial extension. As the second link 704 is moved toward the first link 702, the axial extension 518, which is bent radially outward away from the longitudinal axis 502, can promote further outward bending of the axial extension 518 so that the axial extension 518 can be bent outward and flattened between the first link 702 and the second link 704 in order to form a second bushing flange (not shown) on the bushing 502 that extends radially outwardly from the distal end 514 of the hollow body 510 of the bushing 502.

Thereafter, at least a portion of the deformable post 538 can be flattened against the second face 722 of the second link 704 to form a second rivet flange (not shown) and both links 702, 704 and the bushing 502 can be captured between the rivet flanges 504.

Figure 10:
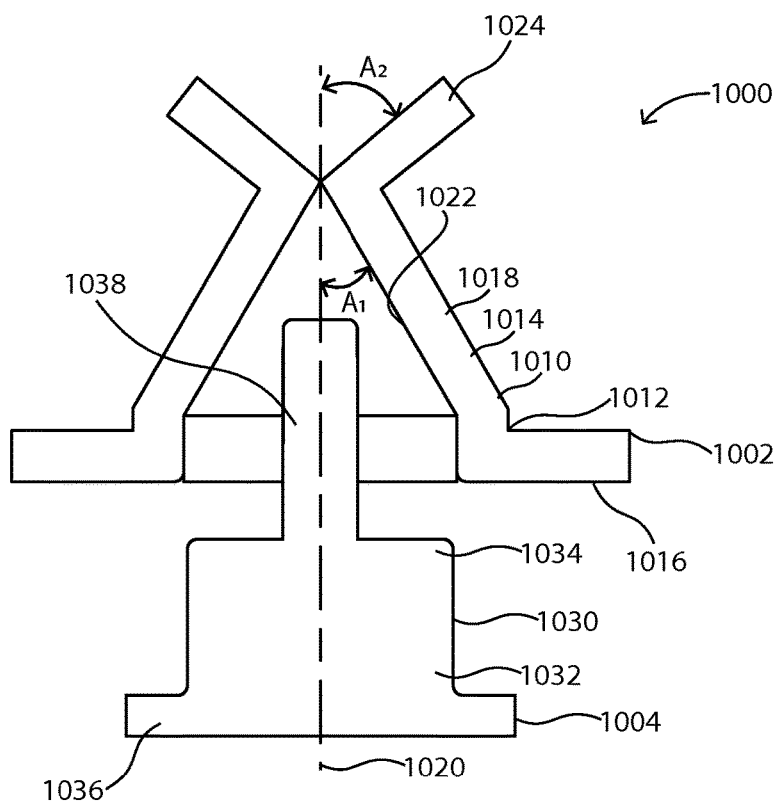
FIG. 10 includes a cross-sectional view of a bearing assembly in accordance with yet another embodiment.
Figure 11:
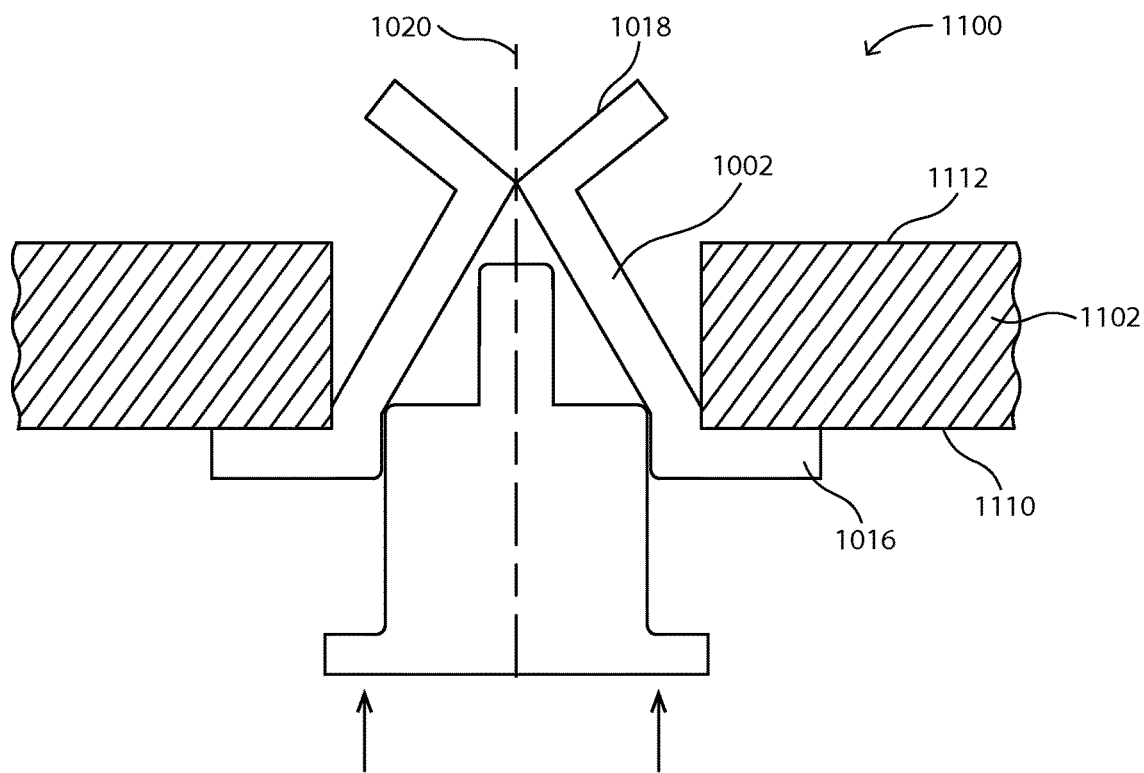
FIG. 11 includes a first cross-sectional view of a multi-link assembly in accordance with yet another embodiment.
Figure 12:
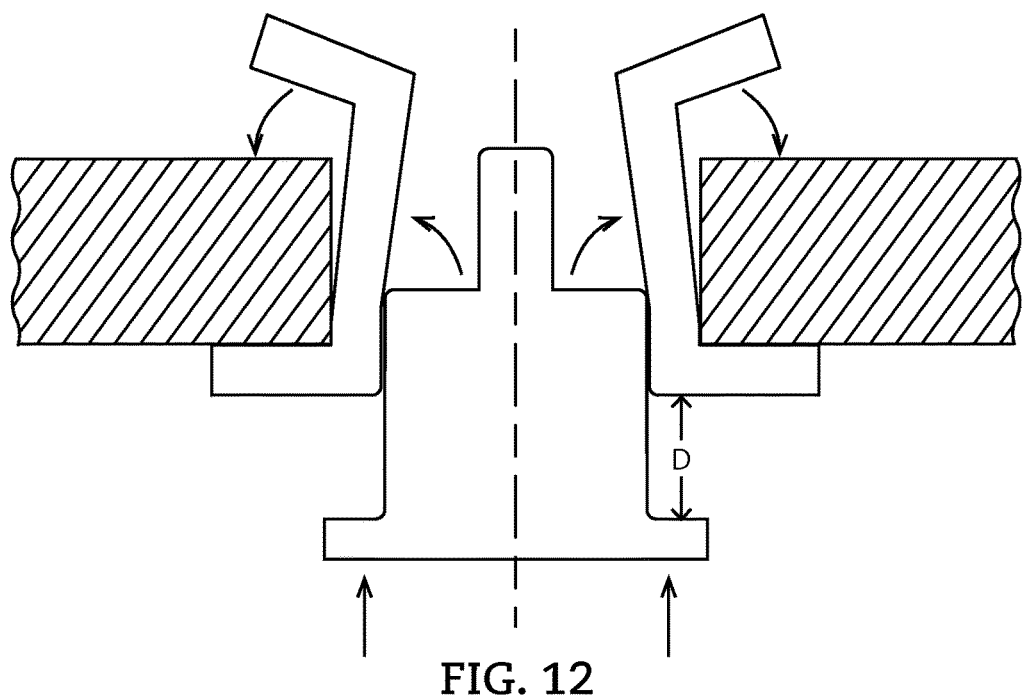
FIG. 12 includes a second cross-sectional view of a multi-link assembly in accordance with yet another embodiment.

FIG. 10 illustrates another bearing assembly 1000. The bearing assembly 1000 can include a bushing 1002 and a rivet 1004 installed within the bushing 1002.

As illustrated, the bushing 1002 can include a hollow body 1010 that can define a proximal end 1012 and a distal end 1014. A first bushing flange 1016 can extend radially outwardly from the proximal end 1012 of the hollow body 1010. An axial extension 1018 can extend from the distal end 1014 of the hollow body 1010. The axial extension 1018 can extend in a direction that is generally parallel to a central, longitudinal axis 1020 of the bearing assembly 1000.

As described in greater detail below, the axial extension 1018 is deformable so as to form a second bushing flange extending radially outwardly from the distal end 1014 of the hollow body 1010. In particular, the axial extension 1018 can include a first portion 1022 that can extend radially inward with respect to the longitudinal axis 1020 at a first angle, $A_1$, to form a ramp and a second portion 1024 that can extend outward with respect to the longitudinal axis 1020 away from the first portion 1022, at a second angle, $A_2$, to form a flange plate.

In a particular aspect, $A_1$ can be $\geq 10°$, such as $\geq 15°$, $\geq 20°$, $\geq 25°$, or $\geq 30°$. Further, $A_1 \leq 60°$, such as $\leq 55°$, $\leq 50°$, $\leq 45°$, or $\leq 40°$. In another aspect, $A_1$ can be within a range between and including any of the angles described herein.

For example, $A_1$ can be $\geq 10°$ and $\leq 60°$, such as $\geq 10°$ and $\leq 55°$, $\geq 10°$ and $\leq 50°$, $\geq 10°$ and $\leq 45°$, or $\geq 10°$ and $\leq 40°$. Moreover, $A_1$ can be $\geq 15°$ and $\leq 60°$, such as $\geq 15°$ and $\leq 55°$, $\geq 15°$ and $\leq 50°$, $\geq 15°$ and $\leq 45°$, or $\geq 15°$ and $\leq 40°$. $A_1$ can be ≥20° and ≤60°, such as ≥20° and ≤55°, ≥20° and ≤50°, ≥20° and ≤45°, or ≥20° and ≤40°. $A_1$ can also be ≥25° and ≤60°, such as ≥25° and ≤55°, ≥25° and ≤50°, ≥25° and ≤45°, or ≥25° and ≤40°. Further, $A_1$ can be ≥30° and ≤60°, such as ≥30° and ≤55°, ≥30° and ≤50°, ≥30° and ≤45°, or ≥30° and ≤40°.

In another particular aspect, $A_2$ can be ≥10°, such as ≥15°, ≥20°, ≥25°, or ≥30°. Further, $A_2$≤60°, such as ≤55°, ≤50°, ≤45°, or ≤40°. In another aspect, $A_2$ can be within a range between and including any of the angles described herein. For example, $A_2$ can be ≥10° and ≤60°, such as ≥10° and ≤55°, ≥10° and ≤50°, ≥10° and ≤45°, or ≥10° and ≤40°. Moreover, $A_2$ can be ≥15° and ≤60°, such as ≥15° and ≤55°, ≥15° and ≤50°, ≥15° and ≤45°, or ≥15° and ≤40°. $A_2$ can be ≥20° and ≤60°, such as ≥20° and ≤55°, ≥20° and ≤50°, ≥20° and ≤45°, or ≥20° and ≤40°. $A_2$ can also be ≥25° and ≤60°, such as ≥25° and ≤55°, ≥25° and ≤50°, ≥25° and ≤45°, or ≥25° and ≤40°. Further, $A_2$ can be ≥30° and ≤60°, such as ≥30° and ≤55°, ≥30° and ≤50°, ≥30° and ≤45°, or ≥30° and ≤40°.

Due to the shape of the first portion 1022, the axial extension 1018 includes an internal diameter, $ID_{AE}$, that is less than the internal diameter, $ID_{HB}$, of the hollow body 1010 of the bushing 1002.

FIG. 10 further illustrates that the rivet 1004 can include a solid body 1030 that can define a proximal end 1032 and a distal end 1034. A first rivet flange 1036 can extend radially outwardly from the proximal end 1032 of the solid body 1030 of the rivet 1004. Moreover, deformable post 1038 can extend from the distal end 1034 of the solid body 1030 in a direction that is generally parallel to the central axis 1020. The deformable post 1038 can be flattened, or otherwise deformed, to form a second rivet flange extending radially outwardly from the distal end 1034 of the solid body 1030 of the rivet 1004.

FIG. 11 through FIG. 14 illustrate a multi-link assembly 1100 in which the bearing assembly 1000 can be used to connect a first link 1102, or first component, to a second link 1104, or second component. As depicted, the first link 1102 can include a first face 1110, a second face 1112 opposite the first face 1110, and a bore 1114 that can extend through the first link 1102 from the first face 1110 to the second face 1112. The second link 1104 can also include a first face 1120, a second face 1122 opposite the first face 1120, and a bore 1124 that can extend through the second link 1104 from the first face 1120 to the second face 1122.

As illustrated in FIG. 11 through FIG. 14, the bushing 1002 of the bearing assembly 1000 can be installed within the bore 1114 in the first link 1102 so that the first bushing flange 1016 of the bushing 1002 engages the first face 1110 of the of the first link 1102 and at least a portion of the outer wall of the bushing 1002 engages, or contacts, an inner wall of the bore 1114. A portion of the axial extension 1018 of the bushing 1002 can extend out of the bore 1114 beyond the second face 1112 of the first link 1102.

After the bushing 1002 of the bearing assembly 1000 is installed within the bore 1114 of the first link 1102, the rivet 1004 can be inserted into the bushing 1002 and the distal end 1034 of the solid body 1030 of the rivet 1004 can engage the ramp formed by the first portion 1022 of the axial extension 1018 of the bushing 1002 in order to deform the axial extension 1018 radially outward with respect to the longitudinal axis.

Figure 13:
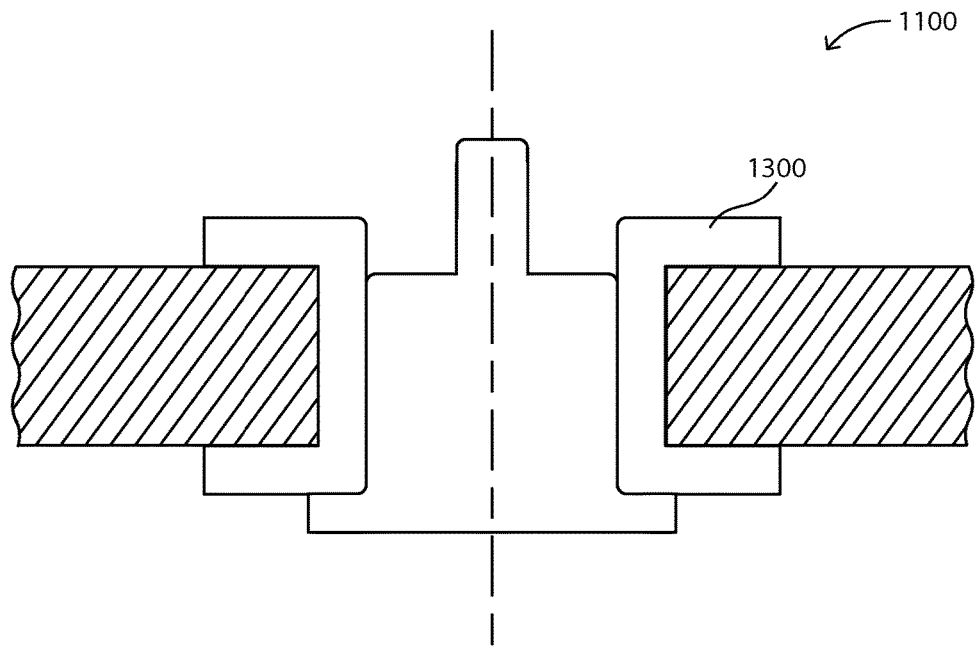
FIG. 13 includes a third cross-sectional view of a multi-link assembly in accordance with yet another embodiment.

As the ramp is pushed outward by the rivet 1004, the flange plate formed by the second portion 1024 of the axial extension 1018 of the bushing 1002 can rotate from a first position in which the flange plate formed by the second portion 1024 is at angle, $A_2$, with respect to the longitudinal axis 1020 and not parallel with respect to the first bushing flange 1016 of the bushing 1002 and a second position, depicted in FIG. 13, in which the flange plate is substantially parallel with respect to the first bushing flange 1016 of the bushing 1002 to form a second bushing flange 1300 on the bushing 1002. Once the rivet 1004 is fully installed within the bushing 1002, the deformable post 1038 of the rivet 1004 can extend beyond the second bushing flange 1300 of the bushing 1002.

Figure 14:
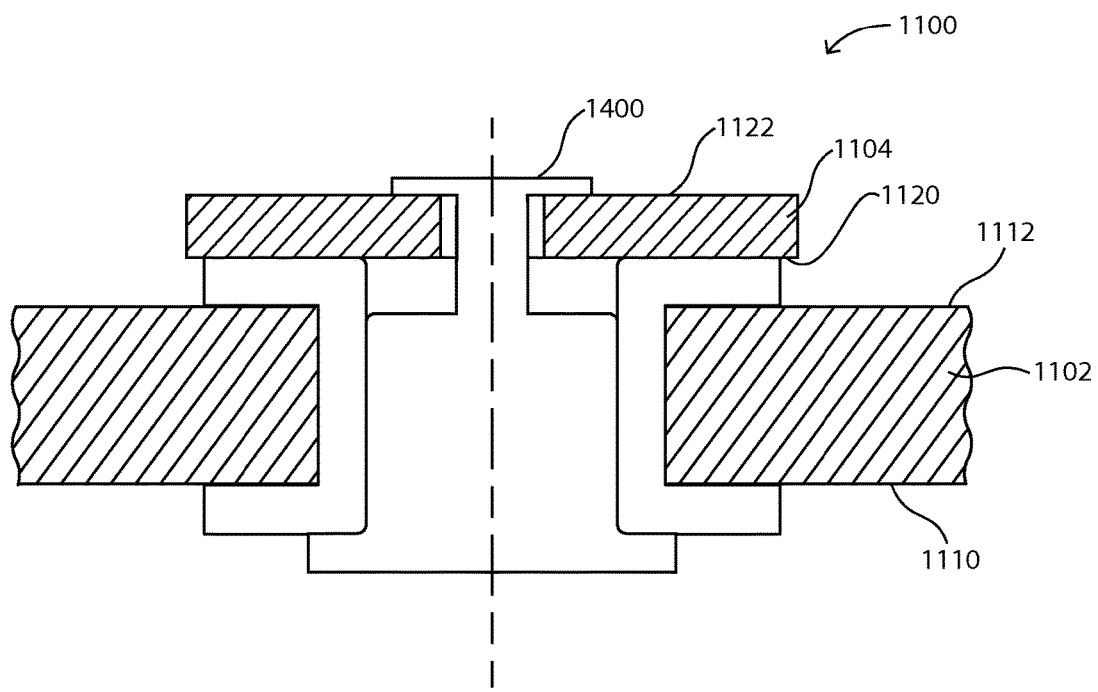
FIG. 14 includes a fourth cross-sectional view of a multi-link assembly in accordance with yet another embodiment.

As illustrated in FIG. 14, the second link 1104 can be installed over the deformable post 1038 of the rivet 1004 so that the bore 1124 in the second link 1104 fits around the deformable post 1038 and the first face 1120 of the second link 1104 engages and contacts the second bushing flange 1300 of the bushing 1002. A portion of the deformable post 1038 of the rivet 1004 can extend beyond the second face 1122 of the second link 1104 and this portion of the deformable post 1038 can be flattened against the second face 1122 of the second link 1104 to form a second rivet flange 1400 and both links 1102, 1104 and the bushing 1002 can be captured between the rivet flanges 1004, 1400.

Figure 15:
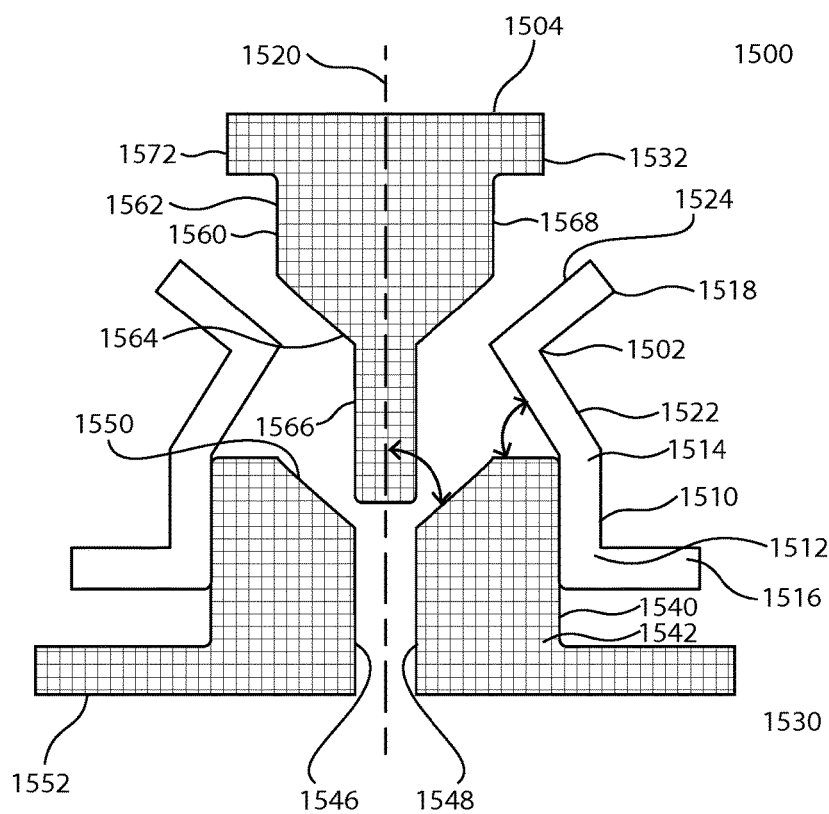
FIG. 15 includes a cross-sectional view of a bearing assembly in accordance with still another embodiment.

FIG. 15 illustrates another bearing assembly 1500. The bearing assembly 1500 can include a bushing 1502 and a rivet 1504 installed within the bushing 1502.

As illustrated, the bushing 1502 can include a hollow body 1510 that can define a proximal end 1512 and a distal end 1514. A first bushing flange 1516 can extend radially outwardly from the proximal end 1512 of the hollow body 1510. An axial extension 1518 can extend from the distal end 1514 of the hollow body 1510. The axial extension 1518 can extend in a direction that is generally parallel to a central, longitudinal axis 1520 of the bearing assembly 1500.

As described in greater detail below, the axial extension 1518 is deformable so as to form a second bushing flange extending radially outwardly from the distal end 1514 of the hollow body 1510. In particular, the axial extension 1518 can include a first portion 1522 that can extend radially inward with respect to the longitudinal axis 1520 at a first angle, $A_1$, to form a ramp and a second portion 1524 that can extend outward with respect to the longitudinal axis 1520 away from the first portion 1522, at a second angle, $A_2$, to form a moveable flange plate.

In a particular aspect, $A_1$ can be ≥10°, such as ≥15°, ≥20°, ≥25°, or ≥30°. Further, $A_1$≤60°, such as ≤55°, ≤50°, ≤45°, or ≤40°. In another aspect, $A_1$ can be within a range between and including any of the angles described herein.

For example, $A_1$ can be ≥10° and ≤60°, such as ≥10° and ≤55°, ≥10° and ≤50°, ≥10° and ≤45°, or ≥10° and ≤40°. Moreover, $A_1$ can be ≥15° and ≤60°, such as ≥15° and ≤55°, ≥15° and ≤50°, ≥15° and ≤45°, or ≥15° and ≤40°. $A_1$ can be ≥20° and ≤60°, such as ≥20° and ≤55°, ≥20° and ≤50°, ≥20° and ≤45°, or ≥20° and ≤40°. $A_1$ can also be ≥25° and ≤60°, such as ≥25° and ≤55°, ≥25° and ≤50°, ≥25° and ≤45°, or ≥25° and ≤40°. Further, $A_1$ can be ≥30° and ≤60°, such as ≥30° and ≤55°, ≥30° and ≤50°, ≥30° and ≤45°, or ≥30° and ≤40°.

In another particular aspect, $A_2$ can be ≥10°, such as ≥15°, ≥20°, ≥25°, or ≥30°. Further, $A_2$≤60°, such as ≤55°, ≤50°, ≤45°, or ≤40°. In another aspect, $A_2$ can be within a range between and including any of the angles described herein. For example, $A_2$ can be ≥10° and ≤60°, such as ≥10° and ≤55°, ≥10° and ≤50°, ≥10° and ≤45°, or ≥10° and ≤40°. Moreover, $A_2$ can be ≥15° and ≤60°, such as ≥15° and ≤55°, ≥15° and ≤50°, ≥15° and ≤45°, or ≥15° and ≤40°. $A_2$ can be ≥20° and ≤60°, such as ≥20° and ≤55°, ≥20° and ≤50°, ≥20° and ≤45°, or ≥20° and ≤40°. $A_2$ can also be ≥25° and ≤60°, such as ≥25° and ≤55°, ≥25° and ≤50°, ≥25° and ≤45°, or ≥25° and ≤40°. Further, $A_2$ can be ≥30° and ≤60°, such as ≥30° and ≤55°, ≥30° and ≤50°, ≥30° and ≤45°, or ≥30° and ≤40°.

Due to the shape of the first portion 1522, the axial extension 1518 includes an internal diameter, $ID_{AE}$, that is less than the internal diameter, $ID_{HB}$, of the hollow body 1510 of the bushing 1502.

FIG. 15 further illustrates that the rivet 1504 can include a first rivet portion 1530 and a second rivet portion 1532. The first rivet portion 1530 can include a body 1540 that defines a proximal end 1542 and a distal end 1544. The body 1540 of the first rivet portion 1530 can be formed with a central bore 1546 that can extend along the longitudinal axis 1520 through the entire height of the body 1540 of the first rivet portion 1530.

The central bore 1546 can include a generally cylindrical portion 1548 and a generally frustoconical portion 1550 attached thereto and extending longitudinally away from the cylindrical portion 1548 along the longitudinal axis 1520. The frustoconical portion 1550 can be bound by an inner surface formed at an angle, $B_1$, with respect to the longitudinal axis 1520. Further, the frustoconical portion 1550 can include a height, $H_{FP1}$. The first rivet portion 1530 can also include a first rivet flange 1552 that can extend radially outward from the proximal end 1542 of the body 1540 of the first rivet portion 1530.

As depicted in FIG. 15, the second rivet portion 1532 can include a body 1560 having a proximal end 1562 and a distal end 1564. A deformable post 1566 can extend from the distal end 1564 of the body 1560. It can be appreciated that the body 1560 and the deformable post 1566 can be considered a single post that is configured to fit into the central bore 1546 formed in the body 1540 of the first rivet portion 1530. The body 1560 of the second rivet portion 1532 can include a generally cylindrical portion 1568 and a generally frustoconical portion 1570. The generally frustoconical portion 1570 can include an outer surface formed at an angle, $B_2$, with respect to the longitudinal axis 1520. The frustoconical portion 1570 of the body 1560 of the second rivet portion 1532 can also include a height, $H_{FP2}$.

For example, $B_1$ can be ≥10° and ≤60°, such as ≥10° and ≤55°, ≥10° and ≤50°, ≥10° and ≤45°, or ≥10° and ≤40°. Moreover, $B_1$ can be ≥15° and ≤60°, such as ≥15° and ≤55°, ≥15° and ≤50°, ≥15° and ≤45°, or ≥15° and ≤40°. $B_1$ can be ≥20° and ≤60°, such as ≥20° and ≤55°, ≥20° and ≤50°, ≥20° and ≤45°, or ≥20° and ≤40°. $B_1$ can also be ≥25° and ≤60°, such as ≥25° and ≤55°, ≥25° and ≤50°, ≥25° and ≤45°, or ≥25° and ≤40°. Further, $B_1$ can be ≥30° and ≤60°, such as ≥30° and ≤55°, ≥30° and ≤50°, ≥30° and ≤45°, or ≥30° and ≤40°.

In another particular aspect, $B_2$ can be ≥10°, such as ≥15°, ≥20°, ≥25°, or ≥30°. Further, $B_2$≤60°, such as ≤55°, ≤50°, ≤45°, or ≤40°. In another aspect, $B_2$ can be within a range between and including any of the angles described herein. For example, $B_2$ can be ≥10° and ≤60°, such as ≥10° and ≤55°, ≥10° and ≤50°, ≥10° and ≤45°, or ≥10° and ≤40°. Moreover, $B_2$ can be ≥15° and ≤60°, such as ≥15° and ≤55°, ≥15° and ≤50°, ≥15° and ≤45°, or ≥15° and ≤40°. $B_2$ can be ≥20° and ≤60°, such as ≥20° and ≤55°, ≥20° and ≤50°, ≥20° and ≤45°, or ≥20° and ≤40°. $B_2$ can also be ≥25° and ≤60°, such as ≥25° and ≤55°, ≥25° and ≤50°, ≥25° and ≤45°, or ≥25° and ≤40°. Further, $B_2$ can be ≥30° and ≤60°, such as ≥30° and ≤55°, ≥30° and ≤50°, ≥30° and ≤45°, or ≥30° and ≤40°.

In yet another aspect, $B_1$ is substantially equal to $B_2$. In a particular aspect, $H_{FP2}$ can be ≥$H_{PF1}$ in order to cause a wedge effect during assembly in order to cause the first rivet portion 1530 to expand radially outward when the second rivet portion 1532 is installed therein, as described below. $H_{FP2}$ can be ≥1.01$H_{PF1}$, such as ≥1.02$H_{PF1}$, ≥1.05$H_{PF1}$, or ≥1.1$H_{PF1}$. Further, $H_{FP2}$ can be ≤1.25$H_{PF1}$, such as ≤1.2$H_{PF1}$, or ≤1.15$H_{PF1}$. In another aspect, $H_{FP2}$ can be within a range between and including any of the values for $H_{FP2}$ described herein.

For example, $H_{FP2}$ can be ≥1.01$H_{PF1}$ and ≤1.25$H_{PF1}$, such as ≥1.01$H_{PF1}$ and ≤1.2$H_{PF1}$, or ≥1.01$H_{PF1}$ and ≤1.15$H_{PF1}$. $H_{FP2}$ can be ≥1.02$H_{PF1}$ and ≤1.25$H_{PF1}$, such as ≥1.02$H_{PF1}$ and ≤1.2$H_{PF1}$, or ≥1.02$H_{PF1}$ and ≤1.15$H_{PF1}$. $H_{FP2}$ can be ≥1.05$H_{PF1}$ and ≤1.25$H_{PF1}$, such as ≥1.05$H_{PF1}$ and ≤1.2$H_{PF1}$, or ≥1.05$H_{PF1}$ and ≤1.15$H_{PF1}$. $H_{FP2}$ can be ≥1.1$H_{PF1}$ and ≤1.25$H_{PF1}$, such as ≥1.1$H_{PF1}$ and ≤1.2$H_{PF1}$, or ≥1.1$H_{PF1}$ and ≤1.15$H_{PF1}$.

As illustrated in FIG. 15, the second rivet portion 1532 can also include a second rivet flange 1572 extending radially outward from the proximal end 1562 of the body 1560 of the second rivet portion 1532 substantially perpendicular to the longitudinal axis 1520.

FIG. 15 indicates that the body 1560 of the first rivet portion 1530 can be configured to fit into the hollow body 1510 of the bushing 1502 such that the first rivet flange 1553 is spaced apart from the first bushing flange 1516 of the bushing 1502 at a distance, D. The first rivet portion 1530 can be configured to travel axially along D in a linear direction during installation to at least partially deform the axial extension 1518 to assist in forming the second bushing flange of the bushing 1502.

Specifically, the ramp formed by the first portion 1522 is configured to be pushed outward by the insertion, or movement, of the first rivet portion 1530 through the hollow body 1510 of the bushing 1502. As the first rivet portion 1530 is moved over D, the ramp can be pushed outward by the distal end 1544 of the body 1540 of the first rivet portion 1530. As the ramp is pushed outward by the first rivet portion 1530, the flange plate formed by the second portion 1524 can rotate from a first position in which the flange plate is angled with respect to the longitudinal axis 1520 at a first angle, and not parallel to the first bushing flange 1516, and a second position in which the flange plate is angle with respect to the longitudinal axis 1520 at a second angle that is closer to being parallel to the first bushing flange 1516.

The insertion of the second rivet portion 1532 into the first rivet portion 1530 can complete the deformation of the axial extension 1518 so that the flange plate formed by the second portion 1524 of the axial extension 1518 is substantially parallel to the first bushing flange 1516.

In a particular aspect, the body 1540 of the first rivet portion 1530 can include a height, $H_B$, and D can be ≥10% $H_B$, such as ≥15% $H_B$, ≥20% $H_B$, ≥25% $H_B$, or ≥30% $H_B$. Further, D can be ≤50% $H_B$, such as ≤45% $H_B$, ≤40% $H_B$, or ≤35% $H_B$. In another aspect, D can be within a range between and including any of the % $H_B$ values described above.

For example, D can be ≥10% $H_B$ and ≤50% $H_B$, such as ≥10% $H_B$ and ≤45% $H_B$, ≥10% $H_B$ and ≤40% $H_B$, or ≥10% $H_B$ and ≤35% $H_B$. In another aspect, D can be ≥15% $H_B$ and ≤50% $H_B$, such as ≥15% $H_B$ and ≤45% $H_B$, ≥15% $H_B$ and ≤40% $H_B$, or ≥15% $H_B$ and ≤35% $H_B$. D can be ≥20% $H_B$ and ≤50% $H_B$, such as ≥20% $H_B$ and ≤45% $H_B$, ≥20% $H_B$ and ≤40% $H_B$, or ≥20% $H_B$ and ≤35% $H_B$. D can be ≥25% $H_B$ and ≤50% $H_B$, such as ≥25% $H_B$ and ≤45% $H_B$, ≥25% $H_B$ and ≤40% $H_B$, or ≥25% $H_B$ and ≤35% $H_B$. Moreover, D can be ≥30% $H_B$ and ≤50% $H_B$, such as ≥30% $H_B$ and ≤45% $H_B$, ≥30% $H_B$ and ≤40% $H_B$, or ≥30% $H_B$ and ≤35% $H_B$.

Figure 16:
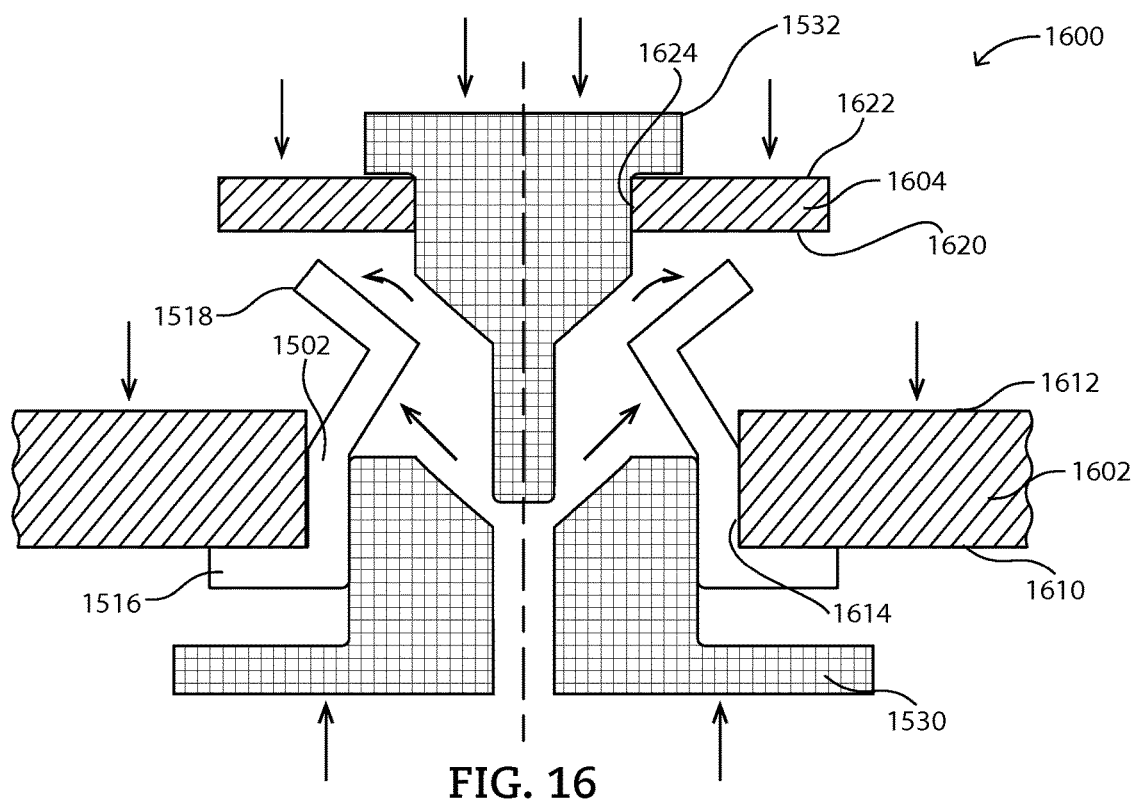
FIG. 16 includes a first cross-sectional view of a multi-link assembly in accordance with still another embodiment.
Figure 17:
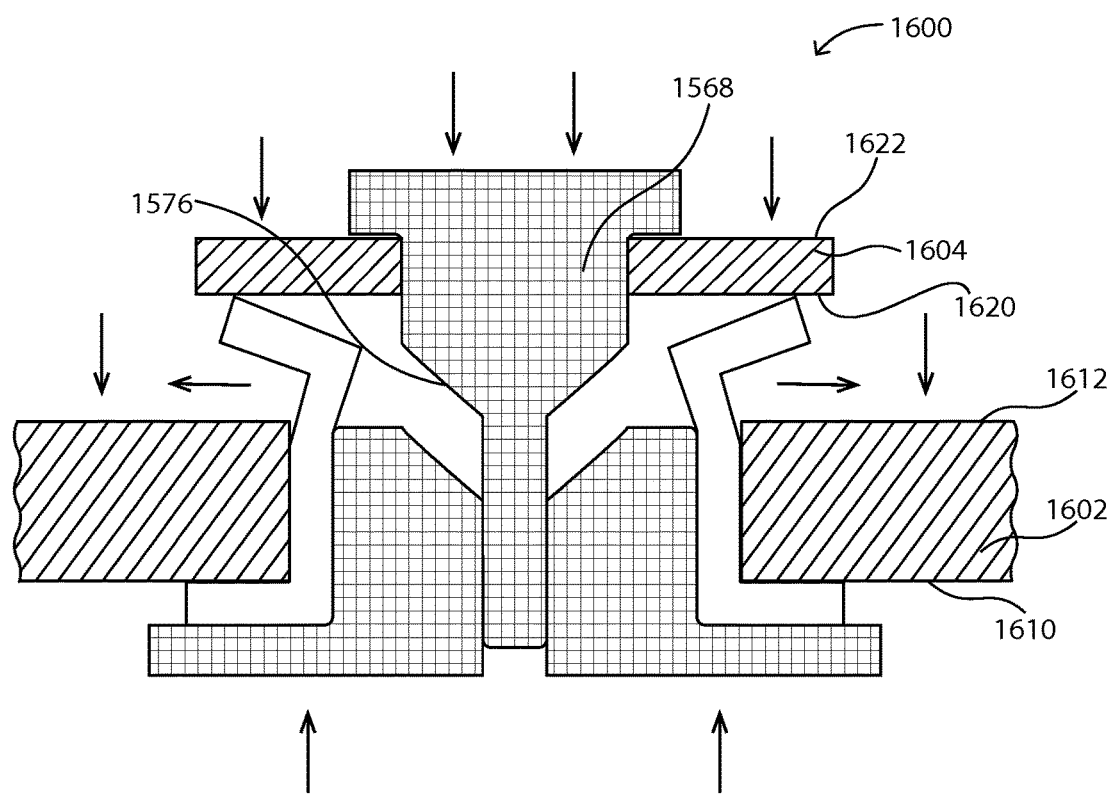
FIG. 17 includes a second cross-sectional view of a multi-link assembly in accordance with still another embodiment.
Figure 18:
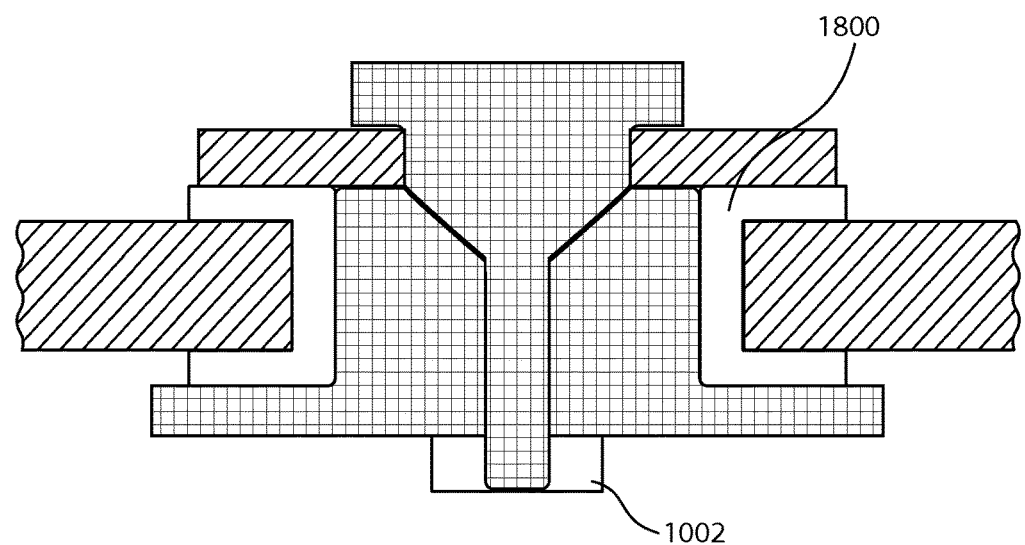
FIG. 18 includes a third cross-sectional view of a multi-link assembly in accordance with still another embodiment.

FIG. 16 through FIG. 18 illustrate a multi-link assembly 1600 in which the bearing assembly 1500 can be used to connect a first link 1602, or first component, to a second link 1604, or second component. As depicted, the first link 1602 can include a first face 1610, a second face 1612 opposite the first face 1610, and a bore 1614 that can extend through the first link 1602 from the first face 1610 to the second face 1612. The second link 1604 can also include a first face 1620, a second face 1622 opposite the first face 1620, and a bore 1624 that can extend through the second link 1604 from the first face 1620 to the second face 1622.

As illustrated in FIG. 16 through FIG. 18, the bushing 1502 of the bearing assembly 1500 can be installed within the bore 1614 in the first link 1602 so that the first bushing flange 1516 of the bushing 1502 engages the first face 1610 of the of the first link 1602 and at least a portion of the outer wall of the bushing 1502 engages, or contacts, an inner wall of the bore 1614. A portion of the axial extension 1518 of the bushing 1502 can extend out of the bore 1614 beyond the second face 1612 of the first link 1602.

After the bearing assembly 1500 is installed within the bore 1614 of the first link 1602, the first rivet portion 1530 can be moved over the distance, D, within the bushing 1502 and the distal end 1544 of the body 1540 of the first rivet portion 1530 can engage the ramp formed by the first portion 1522 of the axial extension 1518 of the bushing 1502 in order to deform the axial extension 1518 radially outward with respect to the longitudinal axis.

As the ramp is pushed outward by the first rivet portion 1530, the flange plate formed by the second portion 1524 of the axial extension 1518 of the bushing 1502 can rotate from a first position in which the flange plate formed by the second portion 1524 is at first angle with respect to the longitudinal axis 1520, and not parallel with respect to the first bushing flange 1516 of the bushing 1502, to a second position toward the second face 1612 of the first link, depicted in FIG. 17, in which the flange plate is at a second angle with respect to the longitudinal axis 1520 and closer to being parallel with respect to the first bushing flange 1516 of the bushing 1502.

The second rivet portion 1532, e.g., the cylindrical portion 1568 of the body 1560 of the second rivet portion 1532, can be inserted through the bore 1624 formed in the second link 1604 and then, the deformable post 1566 and the frustoconical portion 1570 of the body 1560 of the second rivet portion 1532 can be inserted into the bore 1546 formed in the body 1540 of the first rivet portion 1530. The frustoconical portion 1570, e.g., the outer surface thereof, can engage the second portion 1524 of the axial extension 1518 of the bushing 1502 and further deform the second portion 1524 of the axial extension toward the second face 1612 of the first link 1602.

As the second rivet portion 1532 is further moved into the first rivet portion 1530, the first face 1620 of the second link 1604 can come into contact and also engage the second portion 1524 of the axial extension 1518 of the bushing 1502. As the second rivet portion 1532 and the second link 1604 move toward the first link 1602, the first face 1620 of the second link 1604 can further deform the second portion 1524 until the second portion 1524 is substantially flat and sandwiched, or otherwise captured, between the first link 1602 and the second link 1604 to form a second bushing flange 1800. Thereafter, a portion of the deformable post 1566 of the second rivet portion 1532 that extends through the bore 1546 formed in the first rivet portion 1532 and beyond the first rivet flange 1552 can be flattened, or otherwise deformed, to form a third rivet flange 1802 that can maintain the multi-link assembly 1600 in an assembled form.

As the second rivet portion 1532 is installed in the first rivet portion 1530, the height differential between the frustoconical portion 1570 of the body 1660 of the second rivet portion 1532 and the frustoconical portion 1550 of the bore 1546 formed in the body 1540 of the first rivet portion 1530 can cause the first rivet portion 1530 to expand radially outward. In another embodiment, the frustoconical portion 1570 of the body of the second rivet portion 1532 can have the same height as the frustoconical portion 1550 of the bore 146 formed in the body 1540 of the first rivet portion 1530, but the diameter of the frustoconical portion 1570 of the body 1560 of the second rivet portion 1532 along the height thereof can be greater than the diameter of the frustoconical portion 1550 of the bore 146 formed in the body 1540 of the first rivet portion 1530 at corresponding heights.

For example, the frustoconical portion 1570 of the body 1560 of the second rivet portion 1532 can have a diameter, $D_{FP2}$, at any location along the height thereof. The frustoconical portion 1550 of the bore 146 formed in the body 1540 of the first rivet portion 1530 can have a diameter, $D_{FP1}$, at a corresponding location along the height thereof. At any location, $D_{FP2}$ can be ≥$D_{FP1}$. For example, $D_{FP2}$ can be ≥1.01$D_{PF1}$, such as ≥1.02$D_{PF1}$, ≥1.05$D_{PF1}$, or ≥1.1$D_{PF1}$. Further, $D_{FP2}$ can be ≤1.25$D_{PF1}$, such as ≤1.2$D_{PF1}$, or ≤1.15$D_{PF1}$. In another aspect, $D_{FP2}$ can be within a range between and including any of the values for $D_{FP2}$ described herein.

For example, $D_{FP2}$ can be ≥1.01$D_{PF1}$ and ≤1.25$D_{PF1}$, such as ≥1.01$D_{PF1}$ and ≤1.2$D_{PF1}$, or ≥1.01$D_{PF1}$ and ≤1.15$D_{PF1}$. $D_{FP2}$ can be ≥1.02$D_{PF1}$ and ≤1.25$D_{PF1}$, such as ≥1.02$D_{PF1}$ and ≤1.2$D_{PF1}$, or ≥1.02$D_{PF1}$ and ≤1.15$D_{PF1}$. $D_{FP2}$ can be ≥1.05$D_{PF1}$ and ≤1.25$D_{PF1}$, such as ≥1.05$D_{PF1}$ and ≤1.2$D_{PF1}$, or ≥1.05$D_{PF1}$ and ≤1.15$D_{PF1}$. $D_{FP2}$ can be ≥1.1$D_{PF1}$ and ≤1.25$D_{PF1}$, such as ≥1.1$D_{PF1}$ and ≤1.2$D_{PF1}$, or ≥1.1$D_{PF1}$ and ≤1.15$D_{PF1}$.

The difference in diameters can also cause the first rivet portion 1530 to expand radially outward when the second rivet portion 1532 is installed therein as described herein. In a particular aspect, the first rivet portion 1530 can include an unassembled outer diameter, $OD_U$, and an assembled outer diameter, $OD_A$. Due to the height differential or diameter differential, described herein, $OD_U$ can be ≤$OD_A$, such as ≤99% $OD_A$, ≤98% $OD_A$, ≤97% $OD_A$, ≤96% $OD_A$, or ≤95% $OD_A$. Further, $OD_U$ can be ≥85% $OD_A$, such as ≥86% $OD_A$, ≥87% $OD_A$, ≥88% $OD_A$, ≥89% $OD_A$, or ≥90% $OD_A$. It can be appreciated that $OD_U$ can be within a range between and including any of the % $OD_A$ values described herein.

For example, $OD_U$ can be ≤99% $OD_A$ and ≥85% $OD_A$, such as ≤99% $OD_A$ and ≥86% $OD_A$, ≤99% $OD_A$ and ≥87% $OD_A$, ≤99% $OD_A$ and ≥88% $OD_A$, ≤99% $OD_A$ and ≥89% $OD_A$, or ≤99% $OD_A$ and ≥90% $OD_A$. $OD_U$ can be ≤98% $OD_A$ and ≥85% $OD_A$, such as ≤98% $OD_A$ and ≥86% $OD_A$, ≤98% $OD_A$ and ≥87% $OD_A$, ≤98% $OD_A$ and ≥88% $OD_A$, ≤98% $OD_A$ and ≥89% $OD_A$, or ≤98% $OD_A$ and ≥90% $OD_A$. $OD_U$ can be ≤97% $OD_A$ and ≥85% $OD_A$, ≤97% $OD_A$ and ≥86% $OD_A$, ≤97% $OD_A$ and ≥87% $OD_A$, ≤97% $OD_A$ and ≥88% $OD_A$, ≤97% $OD_A$ and ≥89% $OD_A$, or ≤97% $OD_A$ and ≥90% $OD_A$. $OD_U$ can be ≤96% $OD_A$ and ≥85% $OD_A$, such as ≤96% $OD_A$ and ≥86% $OD_A$, ≤96% $OD_A$ and ≥87% $OD_A$, ≤96% $OD_A$ and ≥88% $OD_A$, ≤96% $OD_A$ and ≥89% $OD_A$, or ≤96% $OD_A$ and ≥90% $OD_A$. $OD_U$ can be ≤95% $OD_A$ and ≥85% $OD_A$, such as ≤95% $OD_A$ and ≥86% $OD_A$, ≤95% $OD_A$ and ≥87% $OD_A$, ≤95% $OD_A$ and ≥88% $OD_A$, ≤95% $OD_A$ and ≥89% $OD_A$, or ≤95% $OD_A$ and ≥90% $OD_A$.

Due to the expansion of the first rivet portion 1530 during assembly, the resulting assembly 1600 can be a negative clearance assembly that is substantially tight and can resist rotation. A bearing liner layer included on the bushing 1502, e.g., on an inner surface, an outer surface, or an inner and outer surface, can be in compression. After the assembly 1600 is fully assembled, as shown in FIG. 18, the assembly 1600 can include a torque limit, T, above which the assembly 1600 can rotate. In a particular aspect, T can be ≥20 in·lbs, such as ≥25 in·lbs, ≥30 in·lbs, ≥35 in·lbs, ≥40 in·lbs, ≥45 in·lbs, or ≥50 in·lbs. In another aspect, T can be ≤200 in·lbs, such as ≤175 in·lbs, ≤150 in·lbs, or ≤125 in·lbs. It can be appreciated that T can within a range between and including any of the values of T described herein.

For example, T can be ≥20 in·lbs and ≤200 in·lbs, such as ≥20 in·lbs and ≤175 in·lbs, ≥20 in·lbs and ≤150 in·lbs, or ≥20 in·lbs and ≤125 in·lbs. In another aspect, T can be ≥25 in·lbs and ≤200 in·lbs, such as ≥25 in·lbs and ≤175 in·lbs, ≥25 in·lbs and ≤150 in·lbs, or ≥25 in·lbs and ≤125 in·lbs. T can be ≥30 in·lbs and ≤200 in·lbs, such as ≥30 in·lbs and ≤175 in·lbs, ≥30 in·lbs and ≤150 in·lbs, or ≥30 in·lbs and ≤125 in·lbs. T can be ≥35 in·lbs and ≤200 in·lbs, such as ≥35 in·lbs and ≤175 in·lbs, ≥35 in·lbs and ≤150 in·lbs, or ≥35 in·lbs and ≤125 in·lbs. T can be ≥40 in·lbs and ≤200 in·lbs, such as ≥40 in·lbs and ≤175 in·lbs, ≥40 in·lbs and ≤150 in·lbs, or ≥40 in·lbs and ≤125 in·lbs. T can be ≥45 in·lbs and ≤200 in·lbs, such as ≥45 in·lbs and ≤175 in·lbs, ≥45 in·lbs and ≤150 in·lbs, or ≥45 in·lbs and ≤125 in·lbs. Moreover, T can be ≥50 in·lbs and ≤200 in·lbs, such as ≥50 in·lbs and ≤175 in·lbs, ≥50 in·lbs and ≤150 in·lbs, or ≥50 in·lbs and ≤125 in·lbs.

In each of the embodiments described herein, the bushing can include a low friction layer that can extend along an inner surface of the hollow body, along an outer surface of the hollow body, or along both the inner surface and outer surface of the hollow body. Further, the low friction layer can extend along both sides of the bushing flanges. The low friction layer can include a polymer. Further, the polymer can include a fluoropolymer material. Moreover, the low friction layer can include polytetrafluoroethylene (PTFE).

Further, in each of the embodiments herein, the first bushing flange can have a thickness, $T_{FF}$, and the axial extension can have a thickness, $T_{AE}$. $T_{FF}$ can be ≥90% $T_{AE}$, such as ≥95% $T_{AE}$, ≥96% $T_{AE}$, ≥97% $T_{AE}$, ≥98% $T_{AE}$, ≥99% $T_{AE}$, or ≥100% $T_{AE}$. Further, $T_{FF}$ can be ≤110% $T_{AE}$, such as ≤105% $T_{AE}$, ≤104% $T_{AE}$, ≤103% $T_{AE}$, ≤102% $T_{AE}$, or ≤101% $T_{AE}$. It can be appreciated that T can be within a range between and including any of the % $T_{AE}$ values described herein.

For example, $T_{FF}$ can be ≥90% $T_{AE}$ and ≤110% $T_{AE}$, such as ≥90% $T_{AE}$ and ≤105% $T_{AE}$, ≥90% $T_{AE}$ and ≤104% $T_{AE}$, ≥90% $T_{AE}$ and ≤103% $T_{AE}$, ≥90% $T_{AE}$ and ≤102% $T_{AE}$, or ≥90% $T_{AE}$ and ≤101% $T_{AE}$. $T_{FF}$ can be ≥95% $T_{AE}$ and ≤110% $T_{AE}$, such as ≥95% $T_{AE}$ and ≤105% $T_{AE}$, ≥95% $T_{AE}$ and ≤104% $T_{AE}$, ≥95% $T_{AE}$ and ≤103% $T_{AE}$, ≥95% $T_{AE}$ and ≤102% $T_{AE}$, or ≥95% $T_{AE}$ and ≤101% $T_{AE}$. $T_{FF}$ can be ≥96% $T_{AE}$ and ≤110% $T_{AE}$, such as ≥96% $T_{AE}$ and ≤105% $T_{AE}$, ≥96% $T_{AE}$ and ≤104% $T_{AE}$, ≥96% $T_{AE}$ and ≤103% $T_{AE}$, ≥96% $T_{AE}$ and ≤102% $T_{AE}$, or ≥96% $T_{AE}$ and ≤101% $T_{AE}$. $T_{FF}$ can be ≥97% $T_{AE}$ and ≤110% $T_{AE}$, such as ≥97% $T_{AE}$ and ≤105% $T_{AE}$, ≥97% $T_{AE}$ and ≤104% $T_{AE}$, ≥97% $T_{AE}$ and ≤103% $T_{AE}$, ≥97% $T_{AE}$ and ≤102% $T_{AE}$, or ≥97% $T_{AE}$ and ≤101% $T_{AE}$. $T_{FF}$ can be ≥98% $T_{AE}$ and ≤110% $T_{AE}$, such as ≥98% $T_{AE}$ and ≤105% $T_{AE}$, ≥98% $T_{AE}$ and ≤104% $T_{AE}$, ≥98% $T_{AE}$ and ≤103% $T_{AE}$, ≥98% $T_{AE}$ and ≤102% $T_{AE}$, or ≥98% $T_{AE}$ and ≤101% $T_{AE}$. $T_{FF}$ can be ≥99% $T_{AE}$ and ≤110% $T_{AE}$, such as ≥99% $T_{AE}$ and ≤105% $T_{AE}$, ≥99% $T_{AE}$ and ≤104% $T_{AE}$, ≥99% $T_{AE}$ and ≤103% $T_{AE}$, ≥99% $T_{AE}$ and ≤102% $T_{AE}$, or ≥99% $T_{AE}$ and ≤101% $T_{AE}$. $T_{FF}$ can be ≥100% $T_{AE}$ and ≤110% $T_{AE}$, such as ≥100% $T_{AE}$ and ≤105% $T_{AE}$, ≥100% $T_{AE}$ and ≤104% $T_{AE}$, ≥100% $T_{AE}$ and ≤103% $T_{AE}$, ≥100% $T_{AE}$ and ≤102% $T_{AE}$, or ≥100% $T_{AE}$ and ≤101% $T_{AE}$.

In another aspect, in any of the embodiments described herein, the hollow body can have a thickness, $T_{HB}$, and $T_{HB}$ can be 90% $T_{AE}$, such as ≥95% $T_{AE}$, ≥96% $T_{AE}$, ≥97% $T_{AE}$, ≥98% $T_{AE}$, ≥99% $T_{AE}$, or ≥100% $T_{AE}$. Otherwise, $T_{HB}$ can be ≤110% $T_{AE}$, such as ≤105% $T_{AE}$, ≤104% $T_{AE}$, ≤103% $T_{AE}$, ≤102% $T_{AE}$, or ≤101% $T_{AE}$. It can be appreciated that T can be within a range between and including any of the % $T_{AE}$ values described herein.

For example, $T_{HB}$ can be ≥90% $T_{AE}$ and ≤110% $T_{AE}$, such as ≥90% $T_{AE}$ and ≤105% $T_{AE}$, ≥90% $T_{AE}$ and ≤104% $T_{AE}$, ≥90% $T_{AE}$ and ≤103% $T_{AE}$, ≥90% $T_{AE}$ and ≤102% $T_{AE}$, or ≥90% $T_{AE}$ and ≤101% $T_{AE}$. $T_{HB}$ can be ≥95% $T_{AE}$ and ≤110% $T_{AE}$, such as ≥95% $T_{AE}$ and ≤105% $T_{AE}$, ≥95% $T_{AE}$ and ≤104% $T_{AE}$, ≥95% $T_{AE}$ and ≤103% $T_{AE}$, ≥95% $T_{AE}$ and ≤102% $T_{AE}$, or ≥95% $T_{AE}$ and ≤101% $T_{AE}$. $T_{HB}$ can be ≥96% $T_{AE}$ and ≤110% $T_{AE}$, such as ≥96% $T_{AE}$ and ≤105% $T_{AE}$, ≥96% $T_{AE}$ and ≤104% $T_{AE}$, ≥96% $T_{AE}$ and ≤103% $T_{AE}$, ≥96% $T_{AE}$ and ≤102% $T_{AE}$, or ≥96% $T_{AE}$ and ≤101% $T_{AE}$. $T_{HB}$ can be ≥97% $T_{AE}$ and ≤110% $T_{AE}$, such as ≥97% $T_{AE}$ and ≤105% $T_{AE}$, ≥97% $T_{AE}$ and ≤104% $T_{AE}$, ≥97% $T_{AE}$ and ≤103% $T_{AE}$, ≥97% $T_{AE}$ and ≤102% $T_{AE}$, or ≥97% $T_{AE}$ and ≤101% $T_{AE}$. $T_{HB}$ can be ≥98% $T_{AE}$ and ≤110% $T_{AE}$, such as ≥98% $T_{AE}$ and ≤105% $T_{AE}$, ≥98% $T_{AE}$ and ≤104% $T_{AE}$, ≥98% $T_{AE}$ and ≤103% $T_{AE}$, ≥98% $T_{AE}$ and ≤102% $T_{AE}$, or ≥98% $T_{AE}$ and ≤101% $T_{AE}$. $T_{HB}$ can be ≥99% $T_{AE}$ and ≤110% $T_{AE}$, such as ≥99% $T_{AE}$ and ≤105% $T_{AE}$, ≥99% $T_{AE}$ and ≤104% $T_{AE}$, ≥99% $T_{AE}$ and ≤103% $T_{AE}$, ≥99% $T_{AE}$ and ≤102% $T_{AE}$, or ≥99% $T_{AE}$ and ≤101% $T_{AE}$. $T_{HB}$ can be ≥100% $T_{AE}$ and ≤110% $T_{AE}$, such as ≥100% $T_{AE}$ and ≤105% $T_{AE}$, ≥100% $T_{AE}$ and ≤104% $T_{AE}$, ≥100% $T_{AE}$ and ≤103% $T_{AE}$, ≥100% $T_{AE}$ and ≤102% $T_{AE}$, or ≥100% $T_{AE}$ and ≤101% $T_{AE}$.

In another aspect, in each of the embodiments described herein, the second bushing flange can have a thickness, $T_{SF}$, and $T_{HB}$ can be ≥90% $T_{SF}$, such as ≥95% $T_{SF}$, ≥96% $T_{SF}$, ≥97% $T_{SF}$, ≥98% $T_{SF}$, ≥99% $T_{SF}$, or ≥100% $T_{SF}$. Further, $T_{HB}$ can be ≤110% $T_{SF}$, such as ≤105% $T_{SF}$, ≤104% $T_{SF}$, ≤103% $T_{SF}$, ≤102% $T_{SF}$, or ≤101% $T_{SF}$. It can be appreciated that T can be within a range between and including any of the % $T_{SF}$ values described herein.

For example, $T_{HB}$ can be ≥90% $T_{SF}$ and ≤110% $T_{SF}$, such as ≥90% $T_{SF}$ and ≤105% $T_{SF}$, ≥90% $T_{SF}$ and ≤104% $T_{SF}$, ≥90% $T_{SF}$ and ≤103% $T_{SF}$, ≥90% $T_{SF}$ and ≤102% $T_{SF}$, or ≥90% $T_{SF}$ and ≤101% $T_{SF}$. $T_{HB}$ can be ≥95% $T_{SF}$ and ≤110% $T_{SF}$, such as ≥95% $T_{SF}$ and ≤105% $T_{SF}$, ≥95% $T_{SF}$ and ≤104% $T_{SF}$, ≥95% $T_{SF}$ and ≤103% $T_{SF}$, ≥95% $T_{SF}$ and ≤102% $T_{SF}$, or ≥95% $T_{SF}$ and ≤101% $T_{SF}$. $T_{HB}$ can be ≥96% $T_{SF}$ and ≤110% $T_{SF}$, such as ≥96% $T_{SF}$ and ≤105% $T_{SF}$, ≥96% $T_{SF}$ and ≤104% $T_{SF}$, ≥96% $T_{SF}$ and ≤103% $T_{SF}$, ≥96% $T_{SF}$ and ≤102% $T_{SF}$, or ≥96% $T_{SF}$ and ≤101% $T_{SF}$. $T_{HB}$ can be ≥97% $T_{SF}$ and ≤110% $T_{SF}$, such as ≥97% $T_{SF}$ and ≤105% $T_{SF}$, ≥97% $T_{SF}$ and ≤104% $T_{SF}$, ≥97% $T_{SF}$ and ≤103% $T_{SF}$, ≥97% $T_{SF}$ and ≤102% $T_{SF}$, or ≥97% $T_{SF}$ and ≤101% $T_{SF}$. $T_{HB}$ can be ≥98% $T_{SF}$ and ≤110% $T_{SF}$, such as ≥98% $T_{SF}$ and ≤105% $T_{SF}$, ≥98% $T_{SF}$ and ≤104% $T_{SF}$, ≥98% $T_{SF}$ and ≤103% $T_{SF}$, ≥98% $T_{SF}$ and ≤102% $T_{SF}$, or ≥98% $T_{SF}$ and ≤101% $T_{SF}$. $T_{HB}$ can be ≥99% $T_{SF}$ and ≤110% $T_{SF}$, such as ≥99% $T_{SF}$ and ≤105% $T_{SF}$, ≥99% $T_{SF}$ and ≤104% $T_{SF}$, ≥99% $T_{SF}$ and ≤103% $T_{SF}$, ≥99% $T_{SF}$ and ≤102% $T_{SF}$, or ≥99% $T_{SF}$ and ≤101% $T_{SF}$. $T_{HB}$ can be ≥100% $T_{SF}$ and ≤110% $T_{SF}$, such as ≥100% $T_{SF}$ and ≤105% $T_{SF}$, ≤100% $T_{SF}$ and ≤104% $T_{SF}$, ≥100% $T_{SF}$ and ≤103% $T_{SF}$, ≥100% $T_{SF}$ and ≤102% $T_{SF}$, or ≥100% $T_{SF}$ and ≤101% $T_{SF}$.

With the configuration of structure described herein, the bearing assemblies provide a bushing and fastener that can very quickly and easily align and connect two parts. The bearing assemblies can be used as pivots between the two parts. The bearing layers on the bearing assemblies can allow the bearing assemblies to be used to connect parts having a wider range of tolerances. Alternatively, by reducing the clearing to a negative clearance, the bearing assemblies can be used to prevent rotation between two parts—up to a predefined torque limit.

The operation to create the second bushing flange can be performed as the rivet is installed, as the second link is installed, as a second rivet portion is installed, or any combination thereof. As such, a stand-alone process to create the second bushing flange can be eliminated from a process for connecting two parts. It can be appreciated that the rivet, or the first rivet portion, can be connected to the bushing via a weld to create a pre-assembly. When the pre-assembly is installed within the first link and an installation force is applied to the rivet, the weld can be broken and the rivet can move within the bushing as described herein.

The weld can comprise a series of spot welds at various locations around the circumference of the interface between the rivet and the bushing. Alternatively, the weld can comprise a continuous weld around the circumference of the interface between the rivet and the bushing or a series of smaller continuous welds (larger than spots) evenly spaced around the circumference of the interface between the rivet and the bushing and separated by non-welded portions.

A skilled artisan can recognize that there may be other applications that can utilize a device or assembly having one or more of the characteristics described herein.

Items

Item 1. A bearing device, comprising: a bushing, comprising: a hollow body having an internal diameter, $ID_{HB}$, and proximal ends and distal ends opposite each other; a first bushing flange extending radially outwardly from the proximal end of the body; and an axial extension extending from the distal end of the hollow body, wherein the axial extension is deformable so as to form a second bushing flange extending radially outwardly from the distal and of the hollow body, the axial extension having an internal diameter, $ID_{AE}$, ≤$ID_{HB}$.

Item 2. A fastening device, comprising: a bushing; and a rivet engaged with the bushing; wherein the bushing comprises: a hollow body having an internal diameter, $ID_{HB}$, and proximal and distal ends opposite each other; a first bushing flange extending radially outwardly from the proximal end of the body; and an axial extension extending from the distal end of the hollow body, wherein the axial extension is deformable so as to form a second bushing flange extending radially outwardly from the distal and of the hollow body, the axial extension having an internal diameter, $ID_{AE}$, ≤$ID_{HB}$; and wherein the rivet comprises: a body defining a proximal end and a distal end opposite the proximal end; a rivet flange extending radially outwardly from the proximal end of the body; and a deformable post extending from the distal end of the body, wherein the body is configured to fit into the hollow body such that the rivet flange is engaged with the first bushing flange of the bushing.

Item 3. The device of item 2, wherein the body of the rivet includes a height, $H_{SB}$, and wherein the hollow body of the bushing comprises a height, $H_{HB}$, and wherein $H_{SB}$≤$H_{HB}$, such as $H_{SB}$≤99% $H_{HB}$, $H_{SB}$≤98% $H_{HB}$, $H_{SB}$≤97% $H_{HB}$, $H_{SB}$≤96% $H_{HB}$, or $H_{SB}$≤95% $H_{HB}$.

Item 4. The device of item 3, wherein $H_{SB}$≥90% $H_{HB}$, ≥91% $H_{HB}$, ≥92% $H_{HB}$, ≥93% $H_{HB}$, or ≥94% $H_{HB}$.

Item 5. A fastening device, comprising: a bushing; and a rivet engaged with the bushing; wherein the bushing comprises: a hollow body proximal and distal ends opposite each other; a first bushing flange extending radially outwardly from the proximal end of the hollow body; and an axial extension extending from the distal end of the hollow body, wherein the axial extension is deformable so as to form a second bushing flange extending radially outwardly from the distal and of the hollow body; and wherein the rivet comprises a body defining a proximal end and a distal end opposite the proximal end; a rivet flange extending radially outwardly from the proximal end of the body; and a deformable post extending from the distal end of the body, wherein the body is configured to fit into the hollow body such that the rivet flange is spaced apart from the first bushing flange of the bushing at a distance, D, and the rivet is configured to travel axially along D during installation to at least partially deform the axial extension to form the second bushing flange.

Item 6. The device of item 5, wherein the body of the rivet includes a height, $H_{SB}$, and D≥10% $H_{SB}$, such as ≥15% $H_{SB}$, ≥20% $H_{SB}$, ≥25% $H_{SB}$, or ≥30% $H_{SB}$.

Item 7. The device of item 6, wherein D≤50% $H_{SB}$, such as ≤45% $H_{SB}$, ≤40% $H_{SB}$, or ≤35% $H_{SB}$.

Item 8. A fastening device, comprising: a bushing; and a rivet engaged with the bushing; wherein the bushing comprises: a hollow body defining a proximal end and a distal end opposite the proximal end; a first bushing flange extending radially outwardly from the proximal end of the hollow body; and an axial extension extending from the distal end of the hollow body, wherein the axial extension is deformable so as to form a second bushing flange extending radially outwardly from the distal and of the hollow body; and wherein the rivet comprises: a first rivet portion having a body that defines a proximal end and a distal end and that includes a central bore along a length of the body and a first bushing flange extending radially outwardly from the proximal end of the body; and a second rivet portion having a second bushing flange and a post extending from the second bushing flange, wherein the post is configured to fit into the central bore of the first rivet portion, wherein the first rivet portion and the second rivet portion are configured to engage each other and to at least partially deform the axial extension to form the second bushing flange.

Item 9. The device of item 8, wherein the second rivet portion causes the first rivet portion to expand outwardly when the post is installed within the bore of the first rivet portion.

Item 10. The device of item 9, wherein the first rivet portion includes an unassembled outer diameter, $OD_U$, and an assembled outer diameter, $OD_A$, and wherein $OD_U$≤$OD_A$, such as ≤99% $OD_A$, ≤98% $OD_A$, ≤97% $OD_A$, ≤96% $OD_A$, or ≤95% $OD_A$.

Item 11. The device of item 10, wherein $OD_U$≥85% $OD_A$, such as ≥86% $OD_A$, ≥87% $OD_A$, ≥88% $OD_A$, ≥89% $OD_A$, or ≥90% $OD_A$.

Item 12. A hinge device, comprising: a first component formed with a first bore; a bushing installed within the first bore, wherein the bushing comprises a hollow body having a internal diameter, $ID_{HB}$, proximal and a distal ends opposite each other, a first bushing flange extending from the proximal end of the hollow body, and an axial extension extending from the distal end of the hollow body, wherein the axial extension is deformable so as to form a second bushing flange extending radially outwardly from the distal end of the hollow body and wherein the axial extension having an internal diameter, $ID_{AE}$, $\leq ID_{HB}$; a rivet installed within the hollow body of the bushing, wherein the rivet comprises a body defining a proximal end and a distal end opposite the proximal end, a rivet flange extending radially outwardly from the proximal end of the body, and a deformable post extending from the distal end of the body; and a second component formed with a second bore installed over the deformable post of the rivet, wherein the second component at least partially deforms the axial extension to form the second bushing flange as the second component slides in an axial direction over the deformable post of the rivet.

Item 13. The device of item 12, wherein the second bushing flange is flattened between the first component and the second component after installation.

Item 14. A method of assembling a first component and a second component, the method comprising: installing a bushing in a first hole in the first component, wherein the bushing defines a longitudinal axis and includes a hollow body having proximal and distal ends opposite each other, a first bushing flange extending radially outwardly from the proximal end of the hollow body, and an axial extension extending from the distal end of the hollow body; sliding a rivet through the bushing in a linear direction along the longitudinal axis; sliding a second hole of a second component over the rivet in a linear direction along the longitudinal axis, wherein movement of the rivet, movement of the second component, or a combination of both, deforms the axial extension into a second bushing flange extending radially outwardly from the distal end of the body of the bushing; and deforming a portion of the rivet.

Item 15. The devices or method according to any of items 1, 2, 5, 8, 12, or 14, wherein an outer diameter of the axial extension, $OD_{AE}$, is less than the outer diameter of the hollow body, $OD_{HB}$.

Item 16. The devices or method according to any of items 1, 2, 5, 8, 12, or 14, wherein the axial extension extends longitudinally away from the hollow body and at least a portion of the axial extension is bent inwards with respect to a longitudinal axis.

Item 17. The devices or method of item 16, wherein the axial extension comprises a concave sidewall that is bowed inward with respect to the longitudinal axis.

Item 18. The devices or method of item 16, wherein the axial extension comprises a first portion that extends radially inward with respect to the longitudinal axis to form a shoulder and a second portion that that extends longitudinally away from the first portion to form a hinged arm.

Item 19. The devices or method of item 18, wherein the shoulder is configured to be pushed outward by the insertion of a rivet through the hollow body and as the shoulder is pushed outward the hinged arm rotates from a first position in which the hinged arm is parallel to the longitudinal axis and a second position in which the hinged arm is angled outwardly with respect to the longitudinal axis.

Item 20. The devices or method of item 16, wherein the axial extension comprises a first portion that extends radially inward from the hollow body at a first bushing flange angle, $A_1$, with respect to the longitudinal axis to form a ramp and a second portion that that extends radially outward from the first portion at a second bushing flange angle, $A_2$, with respect the longitudinal axis to form a flange plate.

Item 21. The devices or method of item 20, wherein the ramp is configured to be pushed outward by the insertion of a rivet through the hollow body and as the ramp is pushed outward, the flange plate moves from a first position in which the flange plate is not parallel with respect to the first bushing flange and a second position in which the flange plate is substantially parallel with respect to the first bushing flange.

Item 22. The devices or method of item 20, wherein $A_1 \geq 10°$, such as $\geq 15°$, $\geq 20°$, $\geq 25°$, or $\geq 30°$.

Item 23. The devices or method of item 20, wherein $A_1 \leq 60°$, such as $\leq 55°$, $\leq 50°$, $\leq 45°$, or $\leq 40°$.

Item 24. The devices or method of item 20, wherein $A_2 \geq 10°$, such as $\geq 15°$, $\geq 20°$, $\geq 25°$, or $\geq 30°$.

Item 25. The devices or method of item 20, wherein $A_2 \leq 60°$, such as $\leq 55°$, $\leq 50°$, $\leq 45°$, or $\leq 40°$.

Item 26. The devices or method according to any of items 1, 2, 5, 8, 12, or 14, wherein the first bushing flange has a thickness, $T_{FF}$, and the axial extension has a thickness, $T_{AE}$, and wherein $T_{FF} \geq 90\% \ T_{AE}$, such as $\geq 95\% \ T_{AE}$, $\geq 96\% \ T_{AE}$, $\geq 97\% \ T_{AE}$, $\geq 98\% \ T_{AE}$, $\geq 99\% \ T_{AE}$, or $\geq 100\% \ T_{AE}$.

Item 27. The devices or method of item 26, wherein $T_{FF} \leq 110\% \ T_{AE}$, such as $\leq 105\% \ T_{AE}$, $\leq 104\% \ T_{AE}$, $\leq 103\% \ T_{AE}$, $\leq 102\% \ T_{AE}$, or $\leq 101\% \ T_{AE}$.

Item 28. The devices or method according to any of items 1, 2, 5, 8, 12, or 14, wherein the hollow body has a thickness, $T_{HB}$, and the axial extension has a thickness, $T_{AE}$, and wherein $T_{HB} \geq 90\% \ T_{AE}$, such as $\geq 95\% \ T_{AE}$, $\geq 96\% \ T_{AE}$, $\geq 97\% \ T_{AE}$, $\geq 98\% \ T_{AE}$, $\geq 99\% \ T_{AE}$, or $\geq 100\% \ T_{AE}$.

Item 29. The devices or method of item 28, wherein $T_{HB} \leq 110\% \ T_{AE}$, such as $\leq 105\% \ T_{AE}$, $\leq 104\% \ T_{AE}$, $\leq 103\% \ T_{AE}$, $\leq 102\% \ T_{AE}$, or $\leq 101\%$ T.

Item 30. The devices or method according to any of items 1, 2, 5, 8, 12, or 14, wherein the hollow body has a thickness, $T_{HB}$, and the second bushing flange has a thickness, $T_{SF}$, and wherein $T_{HB} \geq 90\% \ T_{SF}$, such as $\geq 95\% \ T_{SF}$, $\geq 96\% \ T_{SF}$, $\geq 97\% \ T_{SF}$, $\geq 98\% \ T_{SF}$, $\geq 99\% \ T_{SF}$, or $\geq 100\% \ T_{SF}$.

Item 31. The devices or method of item 30, wherein $T_{HB} \leq 110\% \ T_{SF}$, such as $\leq 105\% \ T_{SF}$, $\leq 104\% \ T_{SF}$, $\leq 103\% \ T_{SF}$, $\leq 102\% \ T_{SF}$, or $\leq 101\% \ T_{SF}$.

Item 32. The devices or method according to any of items 1, 2, 5, 8, 12, or 14, wherein the bushing further comprises an inner surface and a low friction layer on the inner surface.

Item 33. The devices or method of item 32, wherein the low friction layer comprises a polymer.

Item 34. The devices or method of item 33, wherein the polymer comprises a fluoropolymer material.

Item 35. The device or method of item 33, wherein the low friction layer comprises polytetrafluoroethylene (PTFE).

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A bearing device comprising:
   a bushing comprising:
   a hollow body having an internal diameter, $ID_{HB}$, a proximal end and a distal end opposite each other;
   a first bushing flange extending radially outward from the proximal end of the body; and
   an axial extension extending from the distal end of the hollow body, the axial extension comprising a first portion that extends radially inward with respect to a longitudinal axis, and a second portion that extends longitudinally away from the first portion, wherein the first bushing flange has a thickness, $T_{FF}$, and the axial extension has a thickness, $T_{AF}$, and wherein $T_{FF} \leq 110\% \, T_{AF}$,
   wherein:
   the axial extension is deformable so as to form a second bushing flange extending radially outwardly from the hollow body,
   the axial extension has an internal diameter, $ID_{AE}$, that is less than $ID_{HB}$, wherein the axial extension extends longitudinally away from the hollow body and a portion of the axial extension is bent inwards with respect to a longitudinal axis, and
   wherein (i) the axial extension comprises a concave sidewall that is bowed inward with respect to the longitudinal axis, and the axial extension comprises a first portion that extends radially inward with respect to the longitudinal axis to form a shoulder and a the second portion that extends longitudinally away from the first portion to form the concave sidewall, or (ii) the axial extension comprises a first portion that extends radially inward from the hollow body at a first bushing flange angle, $A_1$, with respect to the longitudinal axis to form a ramp and a the second portion that extends radially outward from the first portion at a second bushing flange angle, $A_2$, with respect the longitudinal axis to form a flange plate, and wherein $A_2 \leq 60°$.

2. The device of claim 1, wherein an outer diameter of the axial extension, $OD_{AE}$, is less than the outer diameter of the hollow body, $OD_{HB}$.

3. The device of claim 1, wherein an inner surface of the axial extension is spaced apart from a longitudinal axis of the hollow body by a first distance at a location adjacent to the distal end of the hollow body, wherein the inner surface of the axial extension is spaced apart from the longitudinal axis of the hollow body by a second distance at a location spaced apart from the distal end of the hollow body, and wherein the second distance is less than the first distance.

4. The device of claim 1, wherein the shoulder is configured to be pushed outward by the insertion of a rivet through the hollow body.

5. The device of claim 1, wherein the ramp is configured to be pushed outward by the insertion of a rivet through the hollow body and as the ramp is pushed outward, the flange plate moves from a first position in which the flange plate is not parallel with respect to the first bushing flange and a second position in which the flange plate is substantially parallel with respect to the first bushing flange.

6. The device of claim 1, wherein $A_1 \geq 10°$.

7. The device of claim 1, wherein $A_2 \geq 10°$.

8. The device according to claim 1, wherein the first bushing flange as a thickness, $T_{FF}$, and the axial extension has a thickness, $T_{AE}$, and wherein $T_{FF} \geq 90\% \, T_{AE}$.

9. The device according to claim 1, wherein the hollow body has a thickness, $T_{HB}$, and the axial extension has a thickness, $T_{AE}$, wherein $T_{HB} \geq 90\% \, T_{AE}$.

10. The device according to claim 1, wherein the second bushing flange is adapted to have a same length, as measured in a radial direction, as the first bushing flange in an assembled state.

11. The device of claim 1, wherein the inner surface is generally smooth.

12. The device of claim 1, wherein the bushing defines an inner surface and a low friction layer is disposed on the inner surface comprising a polymer comprising a fluoropolymer material.

13. The device of claim 12, wherein the low friction layer comprises polytetrafluoroethylene (PTFE).

14. The device of claim 1, wherein the axial extension is deformable so as to form the second bushing flange.

15. A fastening device comprising:
    a bushing; and
    a rivet rotatably engaged with the bushing;
    wherein the bushing comprises:
    a hollow body having an internal diameter, $ID_{HB}$, and proximal and distal ends opposite each other;
    a first bushing flange extending radially outward from the proximal end of the body; and
    an axial extension extending from the distal end of the hollow body, the axial extension comprising a first portion that extends radially inward with respect to a longitudinal axis, and a second portion that extends longitudinally away from the first portion, wherein the first bushing flange has a thickness, $T_{FF}$, and the axial extension has a thickness, $T_{AE}$, and wherein $T_{FF} \leq 110\% \, T_{AE}$,
    wherein:
    the axial extension is deformable so as to form a second bushing flange extending radially outwardly from the hollow body,
    the axial extension has an internal diameter, $ID_{AE}$, that is less than $ID_{HB}$, wherein the axial extension extends longitudinally away from the hollow body and a portion of the axial extension is bent inwards with respect to a longitudinal axis, and
    wherein (i) the axial extension comprises a concave sidewall that is bowed inward with respect to the longitudinal axis, and the axial extension comprises a first portion that extends radially inward with respect to the longitudinal axis to form a shoulder and a the second portion that extends longitudinally away from the first portion to form the concave sidewall, or (ii) the axial extension comprises a first portion that extends radially inward from the hollow body at a first bushing flange angle, $A_1$, with respect to the longitudinal axis to form a ramp and a the second portion that extends radially outward from the first portion at a second bushing flange angle, $A_2$, with respect the longitudinal axis to form a flange plate, and wherein $A_2 \leq 60°$;
    wherein the rivet comprises:
    a body defining a proximal end and a distal end opposite the proximal end;
    a rivet flange extending radially outwardly from the proximal end of the body; and a deformable post extending from the distal end of the body, wherein the body is configured to fit into the hollow body such that the rivet flange is engaged with the first bushing flange of the bushing.

16. The device of claim 15, wherein the body of the rivet includes a height, $H_{SB}$, and wherein the hollow body of the bushing comprises a height, $H_{HB}$, and wherein $H_{SB} \leq H_{HB}$.

17. The device of claim 15, wherein an inner surface of the axial extension is spaced apart from a longitudinal axis of the hollow body by a first distance at a location adjacent to the distal end of the hollow body, wherein the inner surface of the axial extension is spaced apart from the longitudinal axis of the hollow body by a second distance at a location spaced apart from the distal end of the hollow body, and wherein the second distance is less than the first distance.

* * * * *

UNITED STATES PATENT AND TRADEMARK OFFICE
CERTIFICATE OF CORRECTION

PATENT NO. : 9,915,280 B2
APPLICATION NO. : 14/042247
DATED : March 13, 2018
INVENTOR(S) : Timothy J. Hagan et al.

Page 1 of 1

It is certified that error appears in the above-identified patent and that said Letters Patent is hereby corrected as shown below:

On the Title Page

Under "ABSTRACT", please delete "and" and insert therefor --end-- after "from the distal" and before "of the hollow body".

In the Claims

Column 19, Claim 1, Line 34, please delete "the" after "shoulder and a" and before "second portion".

Column 19, Claim 1, Line 40, please delete "the" after "ramp and a" and before "second portion".

Column 19, Claim 1, Line 42, please insert --to-- after "with respect" and before "the longitudinal".

Column 20, Claim 8, Line 2, please delete "as" and insert therefor --has-- after "bushing flange" and before "a thickness".

Column 20, Claim 15, Line 51, please delete "the" after "shoulder and a" and before "second portion".

Column 20, Claim 15, Line 57, please delete "the" after "ramp and a" and before "second portion".

Column 20, Claim 15, Line 59, please insert --to-- after "with respect" and before "the longitudinal".

Signed and Sealed this
Eighteenth Day of September, 2018

Andrei Iancu
*Director of the United States Patent and Trademark Office*